United States Patent
Tait et al.

(10) Patent No.: US 9,377,869 B2
(45) Date of Patent: *Jun. 28, 2016

(54) UNLOCKING A HEAD MOUNTABLE DEVICE

(71) Applicant: Google Inc., Mountain View, CA (US)

(72) Inventors: Matthew Tait, Christchurch (NZ); Mark Nathan Billinghurst, Christchurch (NZ); Richard Daniel The, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,797

(22) Filed: Sep. 2, 2015

(65) Prior Publication Data
US 2016/0062474 A1 Mar. 3, 2016

Related U.S. Application Data

(63) Continuation of application No. 13/930,959, filed on Jun. 28, 2013, now Pat. No. 9,146,618.

(51) Int. Cl.
*G09G 5/00* (2006.01)
*G06F 3/01* (2006.01)
(Continued)

(52) U.S. Cl.
CPC .............. *G06F 3/017* (2013.01); *G02B 27/017* (2013.01); *G06F 3/012* (2013.01); *G06F 3/041* (2013.01)

(58) Field of Classification Search
CPC ...... G09G 2330/10; G09G 5/00; G06F 3/017; G06F 3/041; G06F 3/012; G02B 27/017
See application file for complete search history.

(56) References Cited

U.S. PATENT DOCUMENTS 5,682,144 A 10/1997 Mannik
5,689,619 A 11/1997 Smyth
(Continued)

FOREIGN PATENT DOCUMENTS

DE 10100017 A1 5/2002
EP 0903661 A1 3/1999
(Continued)

OTHER PUBLICATIONS

Westeyn, Tracy, et al., Biometric Identification Using Song-Based Blink Patterns, Georgia Institute of Technology, available at http://citeseerx.isl.psu.edu/viewdoc/download?doi=10.1.1.85.4472&rep=rep1 &type=pdf (last visited on Sep. 15, 2011).
(Continued)

*Primary Examiner* — Lun-Yi Lao
*Assistant Examiner* — Kelly B Hegarty
(74) *Attorney, Agent, or Firm* — McDonnell Boehnen Hulbert & Berghoff

(57) ABSTRACT

Embodiments described herein may help to provide a lock-screen for a computing device. An example method involves, while a computing device is in a locked mode, the computing device: (a) analyzing head-pose data to determine whether a head pose associated with the computing device matches a predetermined head pose, (b) analyzing touchpad data associated with the computing device to detect a predetermined sequence of touch gestures, (c) if both (i) the head pose matches the predetermined head pose and (ii) the predetermined sequence of touch gestures is detected, then the computing device switching to an unlocked mode, and (d) otherwise, refraining from causing computing device switch to the unlocked mode.

14 Claims, 15 Drawing Sheets

(51) Int. Cl.
*G06F 3/041* (2006.01)
*G02B 27/01* (2006.01)

(56) References Cited

U.S. PATENT DOCUMENTS

| | | | |
|---|---|---|---|
| 5,742,264 | A | 4/1998 | Inagaki et al. |
| 5,959,597 | A | 9/1999 | Yamada et al. |
| 6,184,847 | B1 | 2/2001 | Fateh et al. |
| 6,396,497 | B1 | 5/2002 | Reichlen |
| 7,346,195 | B2 | 3/2008 | Lauper et al. |
| 7,440,592 | B1 | 10/2008 | Nimmer |
| 7,479,949 | B2 | 1/2009 | Jobs et al. |
| 7,876,374 | B2 | 1/2011 | Sako et al. |
| 8,316,319 | B1 | 11/2012 | Patel et al. |
| 8,452,978 | B2 | 5/2013 | Alward et al. |
| 2001/0043402 | A1 | 11/2001 | Melville |
| 2003/0142041 | A1 | 7/2003 | Barlow et al. |
| 2004/0030753 | A1* | 2/2004 | Horvitz ............... G05B 19/404 709/206 |
| 2006/0115130 | A1 | 6/2006 | Kozlay |
| 2006/0253793 | A1 | 11/2006 | Zhai et al. |
| 2007/0188407 | A1 | 8/2007 | Nishi |
| 2008/0122796 | A1 | 5/2008 | Jobs et al. |
| 2008/0165144 | A1* | 7/2008 | Forstall ............... G06F 1/1626 345/173 |
| 2009/0058660 | A1 | 3/2009 | Torch |
| 2009/0315740 | A1* | 12/2009 | Hildreth ............... G06F 3/017 341/20 |
| 2010/0110368 | A1* | 5/2010 | Chaum ............... G02B 27/017 351/158 |
| 2011/0012848 | A1 | 1/2011 | Li et al. |
| 2012/0050044 | A1 | 3/2012 | Border et al. |
| 2012/0050140 | A1 | 3/2012 | Border et al. |
| 2012/0050142 | A1 | 3/2012 | Border et al. |
| 2012/0050143 | A1 | 3/2012 | Border et al. |
| 2012/0188148 | A1* | 7/2012 | DeJong ............... G02B 27/0093 345/8 |
| 2012/0313848 | A1* | 12/2012 | Galor ............... G06F 3/005 345/156 |
| 2013/0069985 | A1* | 3/2013 | Wong ............... G02B 27/017 345/633 |
| 2013/0249861 | A1* | 9/2013 | Chang ............... G06F 3/0412 345/174 |
| 2013/0342569 | A1 | 12/2013 | Karkkainen et al. |
| 2014/0063062 | A1* | 3/2014 | Fateh ............... G06T 11/206 345/633 |

FOREIGN PATENT DOCUMENTS

| | | |
|---|---|---|
| EP | 2202609 A2 | 6/2010 |
| JP | 2001154794 | 6/2001 |
| WO | 2004084054 A2 | 9/2004 |
| WO | 2013/002990 A2 | 1/2013 |
| WO | 2013/012554 A2 | 1/2013 |
| WO | 2013003414 A2 | 1/2013 |
| WO | 2013006518 A2 | 1/2013 |

OTHER PUBLICATIONS

Westeyn, Tracy, et al, Recognizing Song-Based Blink Patterns: Applications for Restricted and Universal Access, Georgia Institute of Technology, available at http://www-static.cc.gatech.edu/fac/Thad.Stamer/p/031_30_Gesture/westeyn_FG2004.pdf (last visited on Sep. 15, 2011).

Lin, Chern-Sheng, et al., A Novel Device for Head Gesture Measurement System in Combination with Eye-Controlled Human-Machine Interface, Optics and Lasers in Engineering, Jun. 2006, pp. 597-614, vol. 44, Issue 6.

Lin, Chern-Sheng, et al., A New Image Processing Method for Evaluating the Pupillary Responses in a HMO Type Eye-Tracking Device, Optics and Lasers Technology, 2003, vol. 35, pp. 505-515.

Yeh, Chin-Yen, Image-Based Human Computer Interfaces for People with Severe Disabilities, available at: http://thesis.lib.ncu.edu.lw/ETD-db/ETD-search/view_etd?URN=955202006#anchor (last visited Sep. 15, 2011 ).

Arai, Kohei, et al., Real Time Blinking Detection Based on Gabor Filter, International Journal of Human Computer Interaction, vol. 1, Issue 3, pp. 33-40, available at http://www.cscjournals.org/csc/manuscripi/Joumals/IJIP/Finalversion/Camera_ready_IJHCI-11.pdf (last visited on Sep. 15, 2011).

Grauman, K., et al., Communication Via Eye Blinks and Eyebrow Raises: Video-Based Human-Computer Interfaces, Univ Access Inf Soc (2003), vol. 2, pp. 359-373.

Ishiguro. Yoshio. et al.. Aided Eyes: Eye Activity Sensing for Daily Life, Proceedings of the 1st Augmented Human International Conference, 2010, available at http://portal.acm.org/citation.cfm?id=1785480 (last visited Sep. 15, 2011).

Fairclough, Stephen H., Physiological Computing: Interfacing with the Human Nervous System, available at http://web.mac.com/shfairclough/Stephen_Fairclough_Research/Publications_physiological_computing_mental_effort_stephen_fairclough_files/probing_experience_sf.pdf (last visited Sep. 16, 2011).

Mulgund, Sandeeps., et al., A Situation-Driven Adaptive Pilot/Vehicle Interface, available at http://citeseerx.ist.psu.edu/viewdoc/download?doi=1 0.1.1.40.2831&rep=rep1&type=pdf (last visited Sep. 16, 2011).

Cho, Hyun Sang, Development of Brain Computer Interface for VR-based Ubiquitous Environment Control System available at http://web.kaist.ac.kr/-haemosu/papers/7.pdf (last visited Sep. 16, 2011).

Caldwell, Tracey, Syntec Optics and Eye-Com Combine Eye Tracking with Head Movement Technology, Biometric Technology Today, Mar. 2011, pp. 2.

NeuroSky Developer Tools 2.1 Supports Eye Blink Detection, pp. 1-100, available at http://gadgetfanboy.com/general/neurosky-developer-tools-21-supports-eye-blink-detection/ (last visited Jul. 8, 2011).

NeuroSky Developer Tools 2.1 Supports Eye Blink Detection, pp. 101-284, available at http://gadgetfanboy.com/general/neurosky-developer-tools-21-supports-eye-blink-detection/ (last visited Jul. 8, 2011).

* cited by examiner

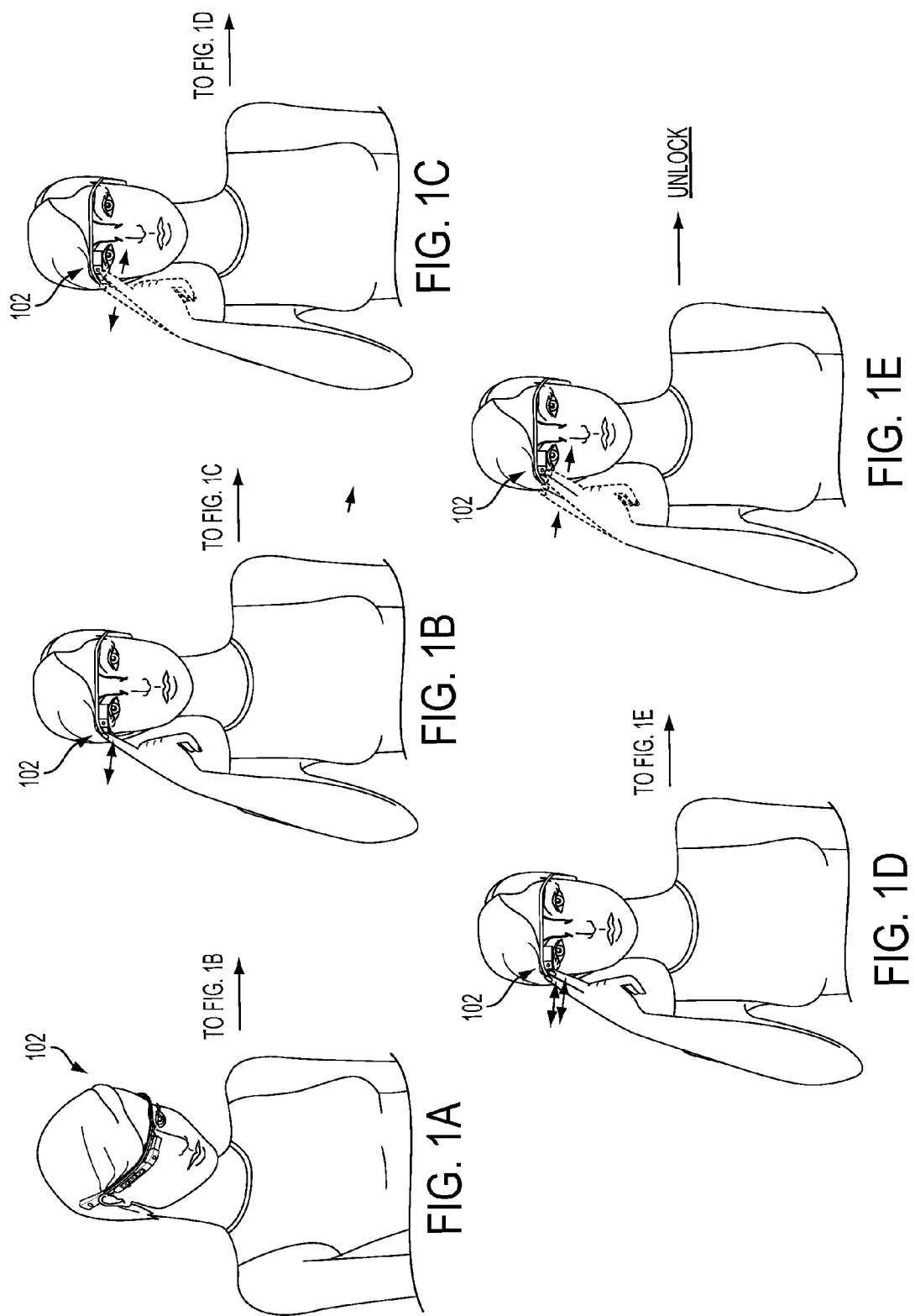

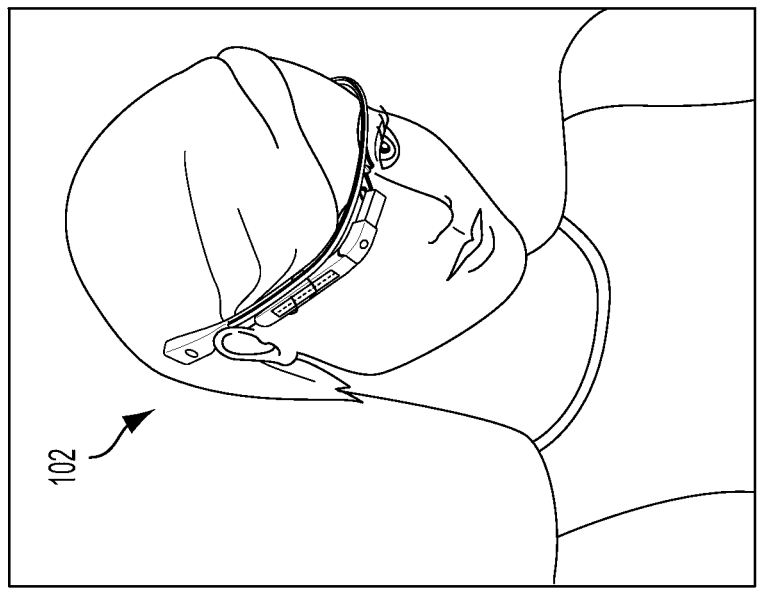
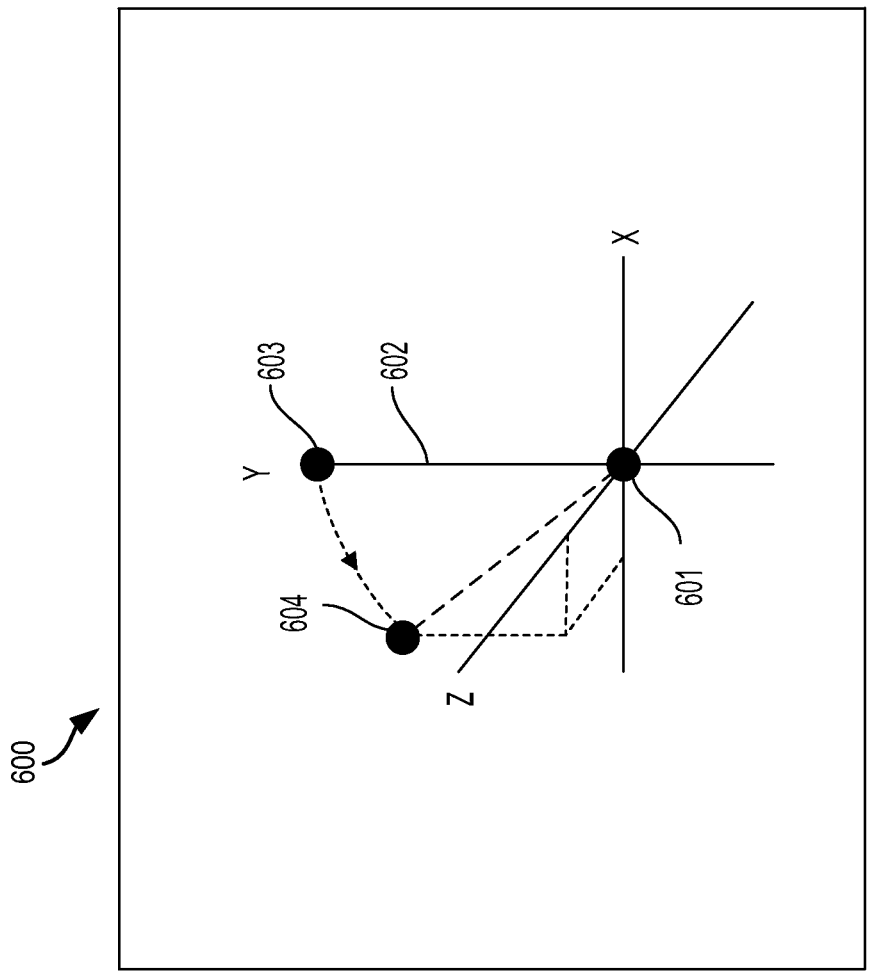
FIG. 6

UNLOCKING A HEAD MOUNTABLE DEVICE

CROSS REFERENCE TO RELATED APPLICATIONS

This application is a continuation of U.S. patent application Ser. No. 13/930,959, filed Jun. 28, 2013, now pending, the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example embodiments help to provide interfaces for unlocking a computing device, and in particular, for unlocking a head-mountable device (HMD), such as a head-mountable display. In particular, example embodiments may allow a user to unlock an HMD or another type of computing device using the combination of a particular head pose (e.g., tilting their head at a particular angle) and predefined sequences of gestures on a touchpad interface.

In one aspect, a computing device may include a non-transitory computer readable medium and program instructions stored on the non-transitory computer readable medium, which are executable by at least one processor to cause the computing device to operate in a locked mode. While the computing device is in the locked mode, the program instructions are further executable by at least one processor to cause the computing device to: (a) analyze head-pose data to determine whether a head pose associated with the computing device matches a predetermined head pose, (b) analyze touchpad data associated with the computing device to detect a predetermined sequence of touch gestures, (c) if both (i) the head pose matches the predetermined head pose and (ii) the predetermined sequence of touch gestures is detected, then cause computing device switch to the unlocked mode; and (d) otherwise, refrain from causing computing device switch to the unlocked mode.

In a further aspect, a method involves, while a computing device is in a locked mode, the computing device: (a) analyzing head-pose data to determine whether a head pose associated with the computing device matches a predetermined head pose, (b) analyzing touchpad data associated with the computing device to detect a predetermined sequence of touch gestures, (c) if both (i) the head pose matches the predetermined head pose and (ii) the predetermined sequence of touch gestures is detected, then the computing device switching to an unlocked mode; and (d) otherwise, refraining from causing computing device switch to the unlocked mode.

In another aspect, a non-transitory computer readable medium has stored therein instructions executable by a computing device, while the computing device is in a locked mode, to cause the computing device to perform functions including: (a) analyzing head-pose data to determine whether a head pose associated with the computing device matches a predetermined head pose, (b) analyzing touchpad data associated with the computing device to detect a predetermined sequence of touch gestures, (c) if both (i) the head pose matches the predetermined head pose and (ii) the predetermined sequence of touch gestures is detected, then the computing device switching to an unlocked mode, and (d) otherwise, refraining from causing computing device switch to the unlocked mode.

In a further aspect, a computing device may include means for, while a computing device is operating in a locked mode: (a) analyzing head-pose data to determine whether a head pose associated with the computing device matches a predetermined head pose, (b) analyzing touchpad data associated with the computing device to detect a predetermined sequence of touch gestures, (c) if both (i) the head pose matches the predetermined head pose and (ii) the predetermined sequence of touch gestures is detected, then the computing device switching to an unlocked mode; and (d) otherwise, refraining from causing computing device switch to the unlocked mode.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 1A to 1E show a wearer unlocking a head-mountable device, according to an example embodiment.

FIG. 6 shows visual feedback to facilitate performance a predefined head pose, according to an example embodiment.

DETAILED DESCRIPTION

Figure 2A:
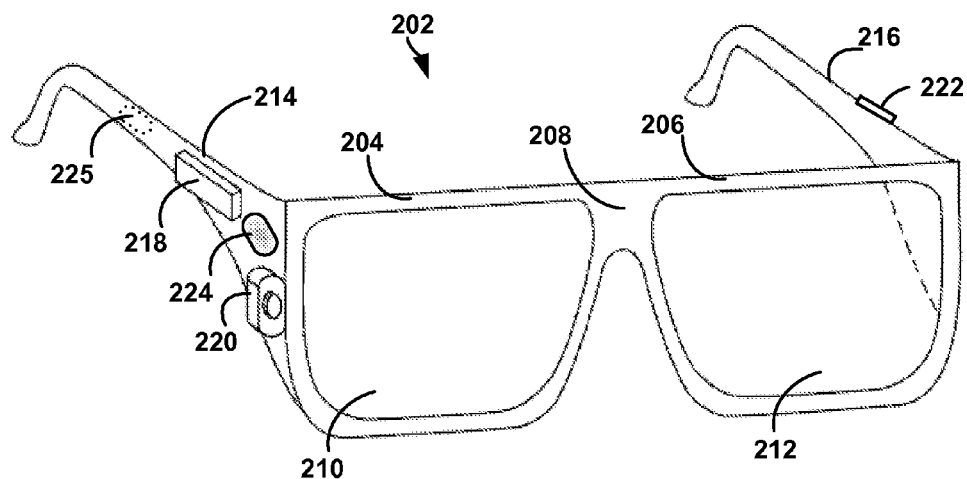
FIG. 2A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments help to provide interfaces for unlocking a computing device, such as a head-mountable device (HMD) or a mobile phone. In an example embodiment, an unlock sequence that unlocks an HMD may include two modalities of input. In particular, an unlock sequence for an HMD may include a pre-defined head pose and a pre-defined sequence of touch gestures.

More specifically, an HMD may be configured to operate in a locked mode, where some or all functionality is limited. While in the locked mode, the HMD may receive and analyze sensor data that is indicative of head movement and/or head pose, and/or sensor data from the HMD's touchpad. As such, to enter their unlock sequence, the wearer of the HMD can move their head into the pre-defined head pose and then perform a pre-defined sequence of swipes and/or taps on a touchpad (or possibly perform the touch-gesture sequence, and then move their head into the pre-defined head pose). The HMD can then detect this input and unlock itself if the unlock sequence has been correctly entered.

In an example embodiment, the head pose may be fairly specific (possibly according to a user setting), so that it may be difficult for an observer to discern the required head pose simply by watching it being performed. Further, the set of touch gestures from which the unlock sequence may be composed may be large enough to provide reasonable diversity of unlock sequences. For example, an unlock sequence may include four touch gestures from a set of ten touch-gestures that includes a single-finger tap, a two-finger tap, single-finger and two-finger forward swipes, single-finger and two-finger backward swipes, single-finger and two-finger forward-and-back swipes, and single-finger and two-finger backward-and-forward swipes. Note however, that an unlock sequence may include more or less touch gestures, without departing from the scope of the invention.

To provide a specific example, FIGS. 1A to 1E show a wearer unlocking an HMD 102, according to an example embodiment. In the illustrated example, the unlock sequence may be include four touch gestures that are each from the set of ten possible touch gestures described above. Specifically, the HMD 102 may be configured to unlock when it detects that the wearer's head is positioned downward and to the left, and then detects a touch-gesture sequence that includes a single-finger tap, followed by a forward-and-backward swipe, followed by a two-finger tap, followed by a two-finger forward swipe.

Thus, to unlock the HMD 102, the wearer may tilt their head downward and to the left so that their head is in the predetermined pose, as shown in FIG. 1A. In order to unlock HMD 102, the wearer may then perform: (a) a single-finger tap gesture on the side-mounted touchpad of HMD 102, as shown in FIG. 1B, followed by (b) a single-finger forward-and-backward swipe gesture on the side-mounted touchpad of HMD 102, as shown in FIG. 1C, followed by (c) a two-finger tap gesture on the side-mounted touchpad of HMD 102, as shown in FIG. 1D, followed by (d) a two-finger forward-swipe gesture on the side-mounted touchpad of HMD 102, as shown in FIG. 1E.

It should be understood that the above-described examples are provided for illustrative purposes, and are not intended to be limiting. Variations on the above examples and/or other examples are also possible.

II. Example Wearable Computing Devices

Systems and devices in which example embodiments may be implemented will now be described in greater detail. In general, an example system may be implemented in or may take the form of a head-mountable device (HMD) or another type of wearable computer (also referred to as a wearable computing device). It should be understood, however, that example systems may also be implemented in or take the form of other devices, such as a mobile phone, a tablet computer, or a personal computer, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes a non-transitory computer readable medium having such program instructions stored thereon.

An HMD may generally be any display device that is capable of being worn on the head and, when worn, is configured to place a display in front of one or both eyes of the wearer. An HMD may take various forms such as a helmet or eyeglasses. As such, references to "eyeglasses" or a "glasses-style" HMD should be understood to refer to any HMD that has a glasses-like frame so that it can be worn on the head. Note, however, that a glasses-style HMD may or may not include a lens in front of one or both eyes. Further, example embodiments may be implemented by or in association with an HMD with a single display or with two displays, which may be referred to as a "monocular" HMD or a "binocular" HMD, respectively.

FIG. 2A illustrates a wearable computing system according to an example embodiment. In FIG. 2A, the wearable computing system takes the form of a head-mountable device (HMD) 202 (which may also be referred to as a head-mounted display). It should be understood, however, that example systems and devices may take the form of or be implemented within or in association with other types of devices, without departing from the scope of the invention. As illustrated in FIG. 2A, the HMD 202 includes frame elements including lens-frames 204, 206 and a center frame support 208, lens elements 210, 212, and extending side-arms 214, 216. The center frame support 208 and the extending side-arms 214, 216 are configured to secure the HMD 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the HMD 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the HMD 202 to the user. The extending side-arms 214, 216 may further secure the HMD 202 to the user by extending around a rear portion of the user's head. Additionally or alternatively, for example, the HMD 202 may connect to or be affixed within a head-mounted helmet structure. Other configurations for an HMD are also possible.

The HMD 202 may also include an on-board computing system 218, an image capture device 220, a sensor 222, and a finger-operable touchpad 224. The on-board computing system 218 is shown to be positioned on the extending side-arm 214 of the HMD 202; however, the on-board computing system 218 may be provided on other parts of the HMD 202 or may be positioned remote from the HMD 202 (e.g., the on-board computing system 218 could be wire- or wirelessly-connected to the HMD 202). The on-board computing system 218 may include a processor and memory, for example. The on-board computing system 218 may be configured to receive and analyze data from the image capture device 220 and the finger-operable touchpad 224 (and possibly from other sensory devices, user interfaces, or both) and generate images for output by the lens elements 210 and 212.

The image capture device 220 may be, for example, a camera that is configured to capture still images and/or to capture video. In the illustrated configuration, image capture device 220 is positioned on the extending side-arm 214 of the HMD 202; however, the image capture device 220 may be provided on other parts of the HMD 202. The image capture device 220 may be configured to capture images at various resolutions or at different frame rates. Many image capture devices with a small form-factor, such as the cameras used in mobile phones or webcams, for example, may be incorporated into an example of the HMD 202.

Further, although FIG. 2A illustrates one image capture device 220, more image capture device may be used, and each may be configured to capture the same view, or to capture different views. For example, the image capture device 220 may be forward facing to capture at least a portion of the real-world view perceived by the user. This forward facing image captured by the image capture device 220 may then be used to generate an augmented reality where computer generated images appear to interact with or overlay the real-world view perceived by the user.

The sensor 222 is shown on the extending side-arm 216 of the HMD 202; however, the sensor 222 may be positioned on other parts of the HMD 202. For illustrative purposes, only one sensor 222 is shown. However, in an example embodiment, the HMD 202 may include multiple sensors. For example, an HMD 202 may include sensors 202 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 224 is shown on the extending side-arm 214 of the HMD 202. However, the finger-operable touchpad 224 may be positioned on other parts of the HMD 202. Also, more than one finger-operable touchpad may be present on the HMD 202. The finger-operable touchpad 224 may be used by a user to input commands. The finger-operable touchpad 224 may sense at least one of a pressure, position and/or a movement of one or more fingers via capacitive sensing, resistance sensing, or a surface acoustic wave process, among other possibilities. The finger-operable touchpad 224 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 224 may be formed of one or more translucent or transparent insulating layers and one or more translucent or transparent conducting layers. Edges of the finger-operable touchpad 224 may be formed to have a raised, indented, or roughened surface, so as to provide tactile feedback to a user when the user's finger reaches the edge, or other area, of the finger-operable touchpad 224. If more than one finger-operable touchpad is present, each finger-operable touchpad may be operated independently, and may provide a different function.

Note that an HMD 202 may additionally or alternatively receive touch input via a touchpad that is not mounted to or integrated with the body of the HMD. For example, an HMD 202 may receive touch input via a hand-held touchpad, or via a touchpad on a device such as mobile phone or tablet computer, which is communicated coupled to the HMD via a wired or wireless connection. Other examples are also possible.

In a further aspect, HMD 202 may be configured to receive user input in various ways, in addition or in the alternative to user input received via finger-operable touchpad 224. For example, on-board computing system 218 may implement a speech-to-text process and utilize a syntax that maps certain spoken commands to certain actions. In addition, HMD 202 may include one or more microphones via which a wearer's speech may be captured. Configured as such, HMD 202 may be operable to detect spoken commands and carry out various computing functions that correspond to the spoken commands.

As another example, HMD 202 may interpret certain head-movements as user input. For example, when HMD 202 is worn, HMD 202 may use one or more gyroscopes and/or one or more accelerometers to detect head movement. The HMD 202 may then interpret certain head-movements as being user input, such as nodding, or looking up, down, left, or right. An HMD 202 could also pan or scroll through graphics in a display according to movement. Other types of actions may also be mapped to head movement.

As yet another example, HMD 202 may interpret certain gestures (e.g., by a wearer's hand or hands) as user input. For example, HMD 202 may capture hand movements by analyzing image data from image capture device 220, and initiate actions that are defined as corresponding to certain hand movements.

As a further example, HMD 202 may interpret eye movement as user input. In particular, HMD 202 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 202 also includes a speaker 225 for generating audio output. In one example, the speaker could be in the form of a bone conduction speaker, also referred to as a bone conduction transducer (BCT). Speaker 225 may be, for example, a vibration transducer or an electroacoustic transducer that produces sound in response to an electrical audio signal input. The frame of HMD 202 may be designed such that when a user wears HMD 202, the speaker 225 contacts the wearer. Alternatively, speaker 225 may be embedded within the frame of HMD 202 and positioned such that, when the HMD 202 is worn, speaker 225 vibrates a portion of the frame that contacts the wearer. In either case, HMD 202 may be configured to send an audio signal to speaker 225, so that vibration of the speaker may be directly or indirectly transferred to the bone structure of the wearer. When the vibrations travel through the bone structure to the bones in the middle ear of the wearer, the wearer can interpret the vibrations provided by BCT 225 as sounds.

Various types of bone-conduction transducers (BCTs) may be implemented, depending upon the particular implementation. Generally, any component that is arranged to vibrate the HMD 202 may be incorporated as a vibration transducer. Yet further it should be understood that an HMD 202 may include a single speaker 225 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 225 can vibrate the wearer's bone structure.

Figure 2B:
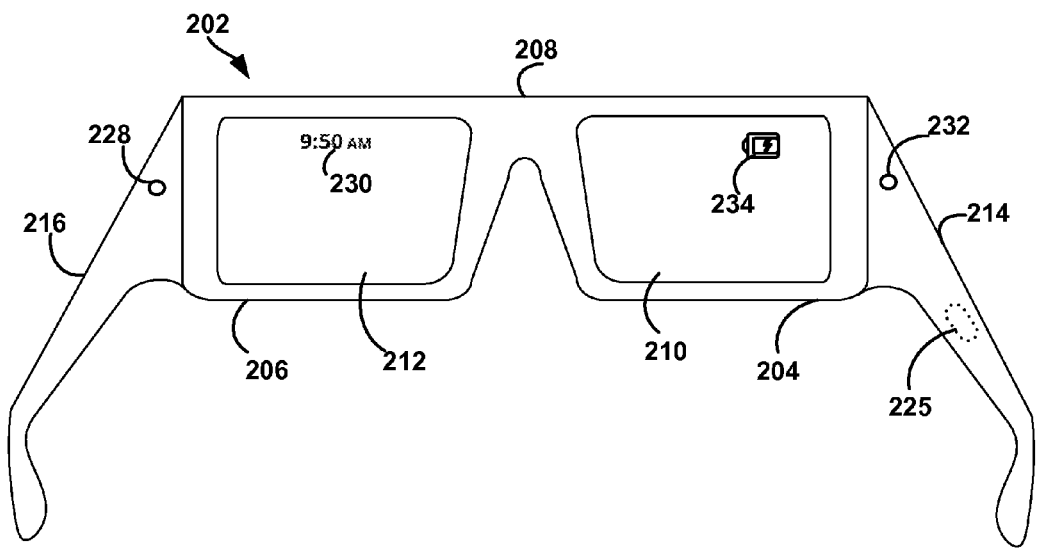
FIG. 2B illustrates an alternate view of the wearable computing device illustrated in FIG. 2A.

FIG. 2B illustrates an alternate view of the wearable computing device illustrated in FIG. 2A. As shown in FIG. 2B, the lens elements 210, 212 may act as display elements. The HMD 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210, 212 may act as a combiner in a light projection system and may include a coating that reflects the light projected onto them from the projectors 228, 232. In some embodiments, a reflective coating may not be used (e.g., when the projectors 228, 232 are scanning laser devices).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 204, 206 for driving such a matrix display. Alternatively or additionally, a laser or LED source and scanning system could be used to draw a raster display directly onto the retina of one or more of the user's eyes. Other possibilities exist as well.

Figure 2C:
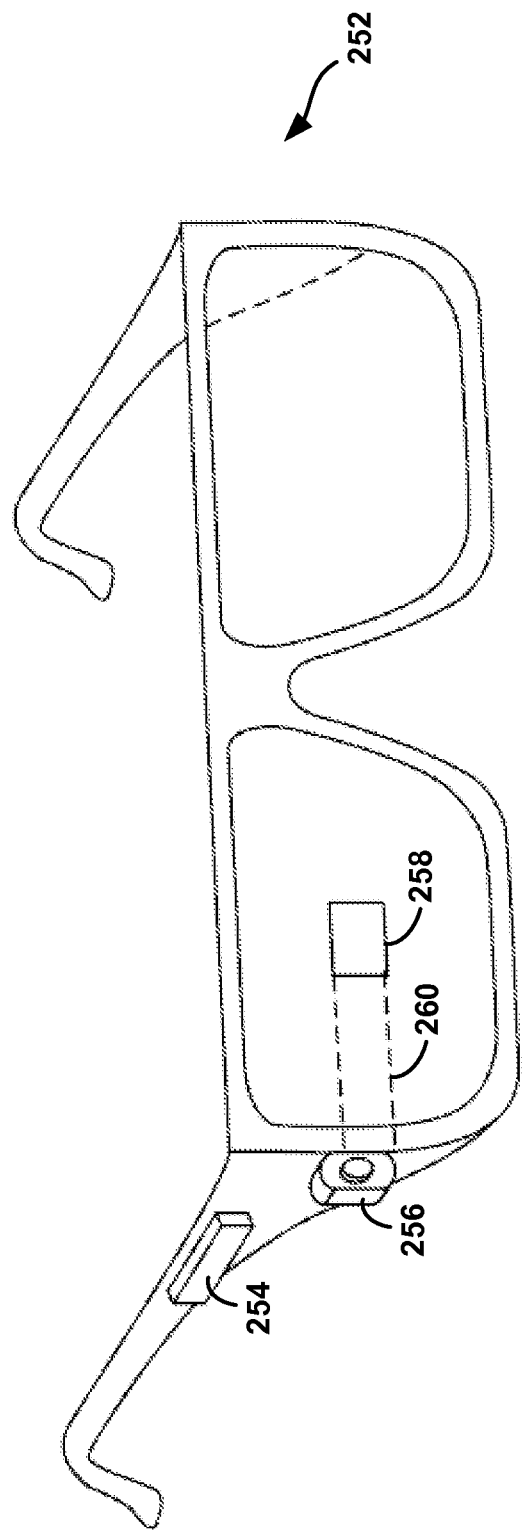
FIG. 2C illustrates another wearable computing system according to an example embodiment.

FIG. 2C illustrates another wearable computing system according to an example embodiment, which takes the form of an HMD 252. The HMD 252 may include frame elements and side-arms such as those described with respect to FIGS. 2A and 2B. The HMD 252 may additionally include an on-board computing system 254 and an image capture device 256, such as those described with respect to FIGS. 2A and 2B. The image capture device 256 is shown mounted on a frame of the HMD 252. However, the image capture device 256 may be mounted at other positions as well.

As shown in FIG. 2C, the HMD 252 may include a single display 258 which may be coupled to the device. The display 258 may be formed on one of the lens elements of the HMD 252, such as a lens element described with respect to FIGS. 2A and 2B, and may be configured to overlay computer-generated graphics in the user's view of the physical world. The display 258 is shown to be provided in a center of a lens of the HMD 252, however, the display 258 may be provided in other positions, such as for example towards either the upper or lower portions of the wearer's field of view. The display 258 is controllable via the computing system 254 that is coupled to the display 258 via an optical waveguide 260.

Figure 2D:
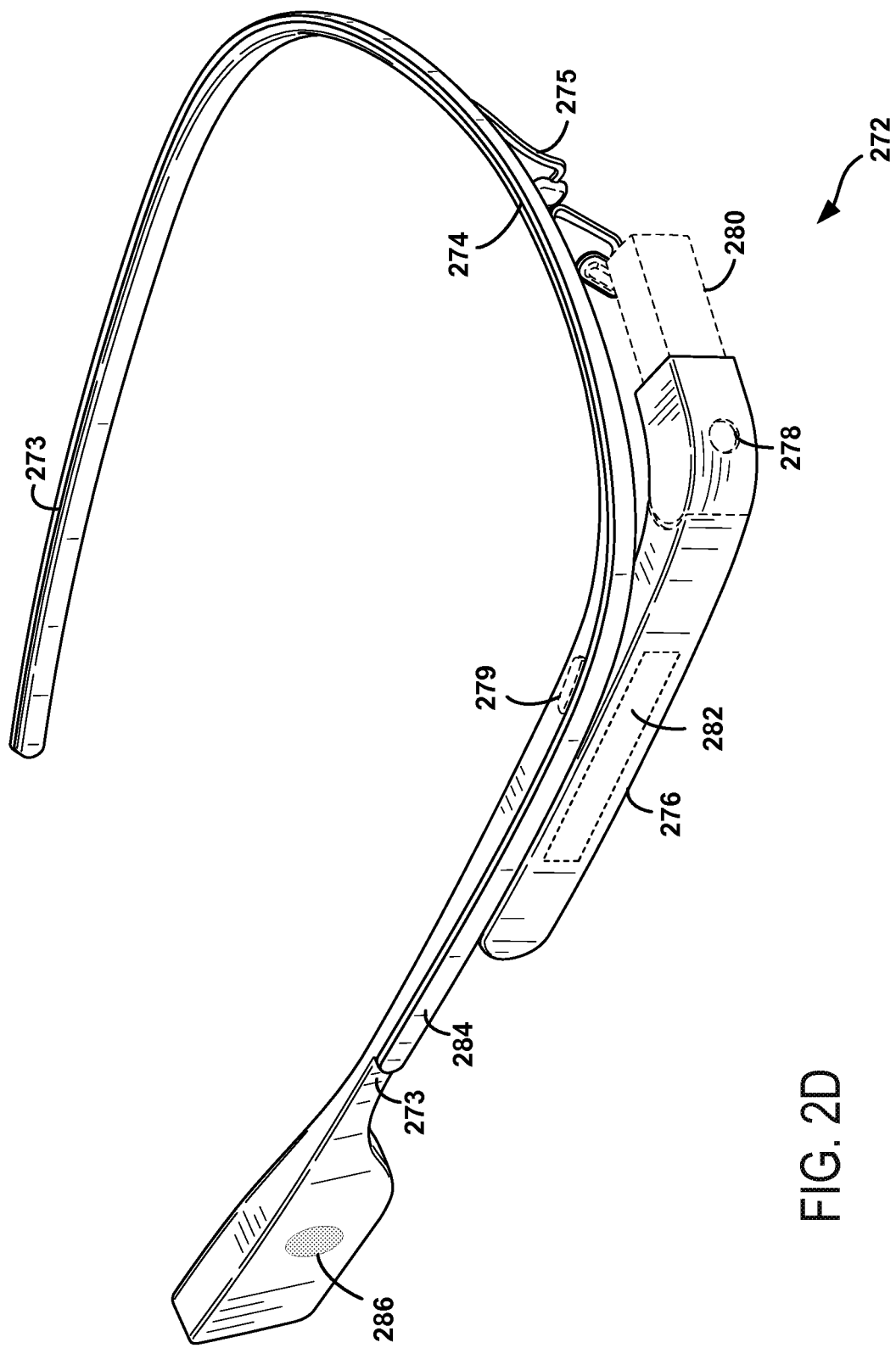
FIG. 2D illustrates another wearable computing system according to an example embodiment.

FIG. 2D illustrates another wearable computing system according to an example embodiment, which takes the form of a monocular HMD 272. The HMD 272 may include side-arms 273, a center frame support 274, and a bridge portion with nosepiece 275. In the example shown in FIG. 2D, the center frame support 274 connects the side-arms 273. The HMD 272 does not include lens-frames containing lens elements. The HMD 272 may additionally include a component housing 276, which may include an on-board computing system (not shown), an image capture device 278, and a button 279 for operating the image capture device 278 (and/or usable for other purposes). Component housing 276 may also include other electrical components and/or may be electrically connected to electrical components at other locations within or on the HMD. HMD 272 also includes a BCT 286.

The HMD 272 may include a single display 280, which may be coupled to one of the side-arms 273 via the component housing 276. In an example embodiment, the display 280 may be a see-through display, which is made of glass and/or another transparent or translucent material, such that the wearer can see their environment through the display 280. Further, the component housing 276 may include the light sources (not shown) for the display 280 and/or optical elements (not shown) to direct light from the light sources to the display 280. As such, display 280 may include optical features that direct light that is generated by such light sources towards the wearer's eye, when HMD 272 is being worn.

In a further aspect, HMD 272 may include a sliding feature 284, which may be used to adjust the length of the side-arms 273. Thus, sliding feature 284 may be used to adjust the fit of HMD 272. Further, an HMD may include other features that allow a wearer to adjust the fit of the HMD, without departing from the scope of the invention.

Figure 2E:
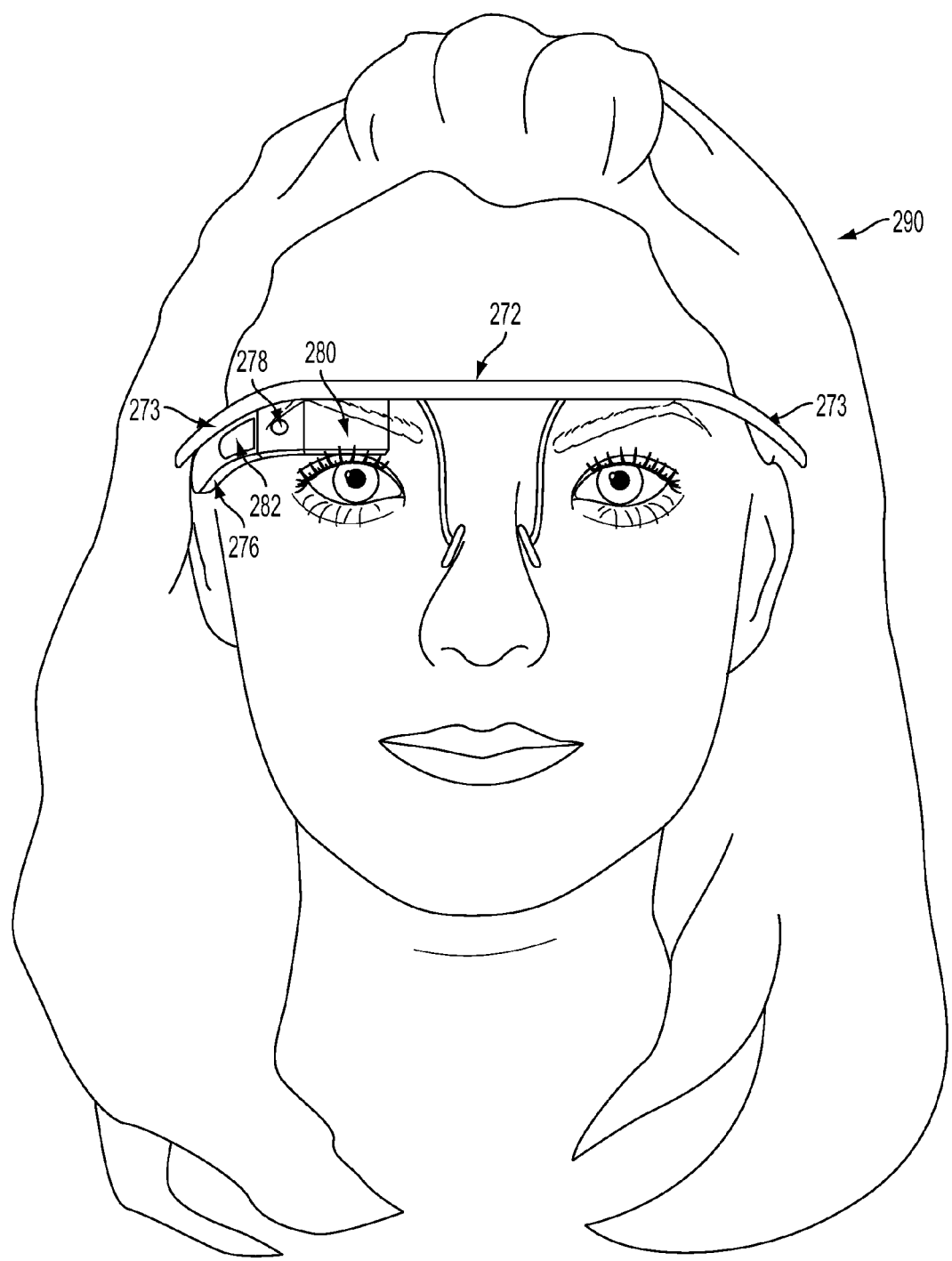
FIGS. 2E to 2G are simplified illustrations of the wearable computing system shown in FIG. 2D, being worn by a wearer.
Figure 2F:
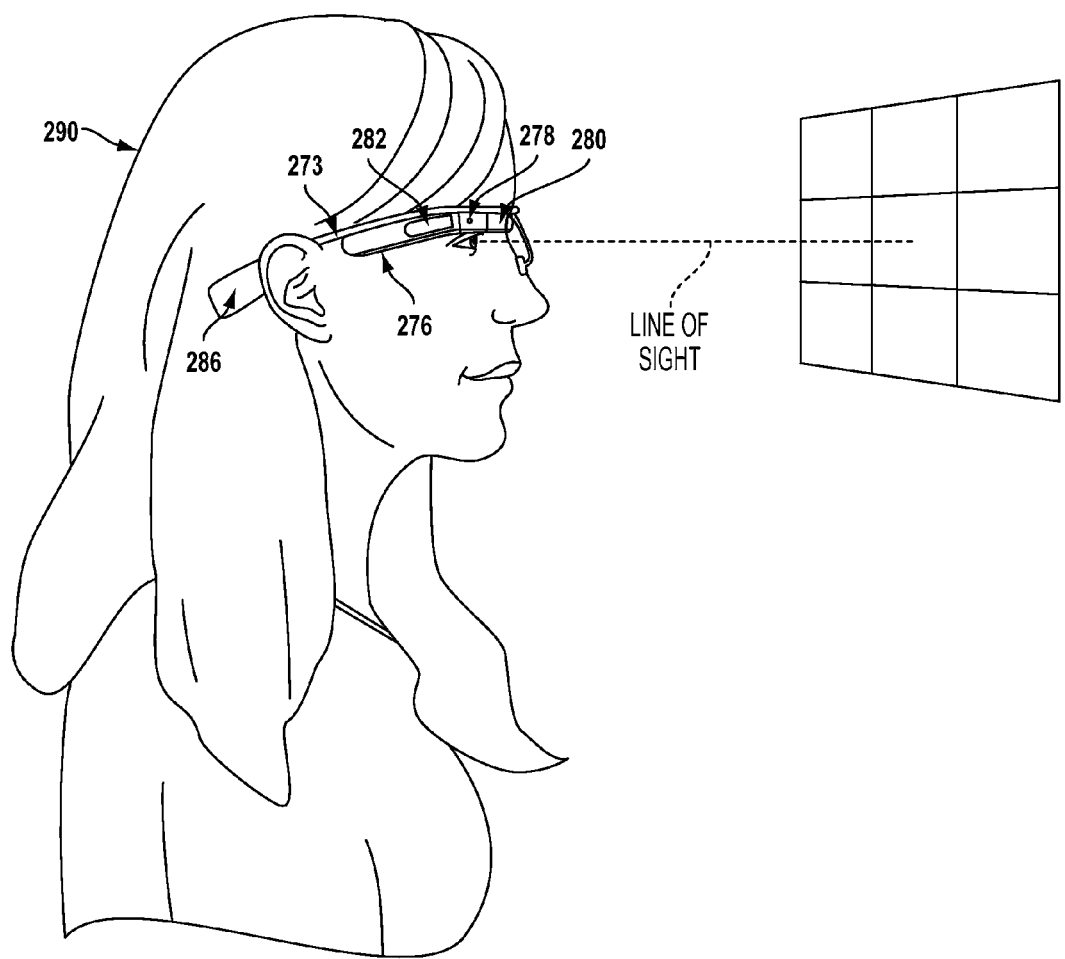
Figure 2G:
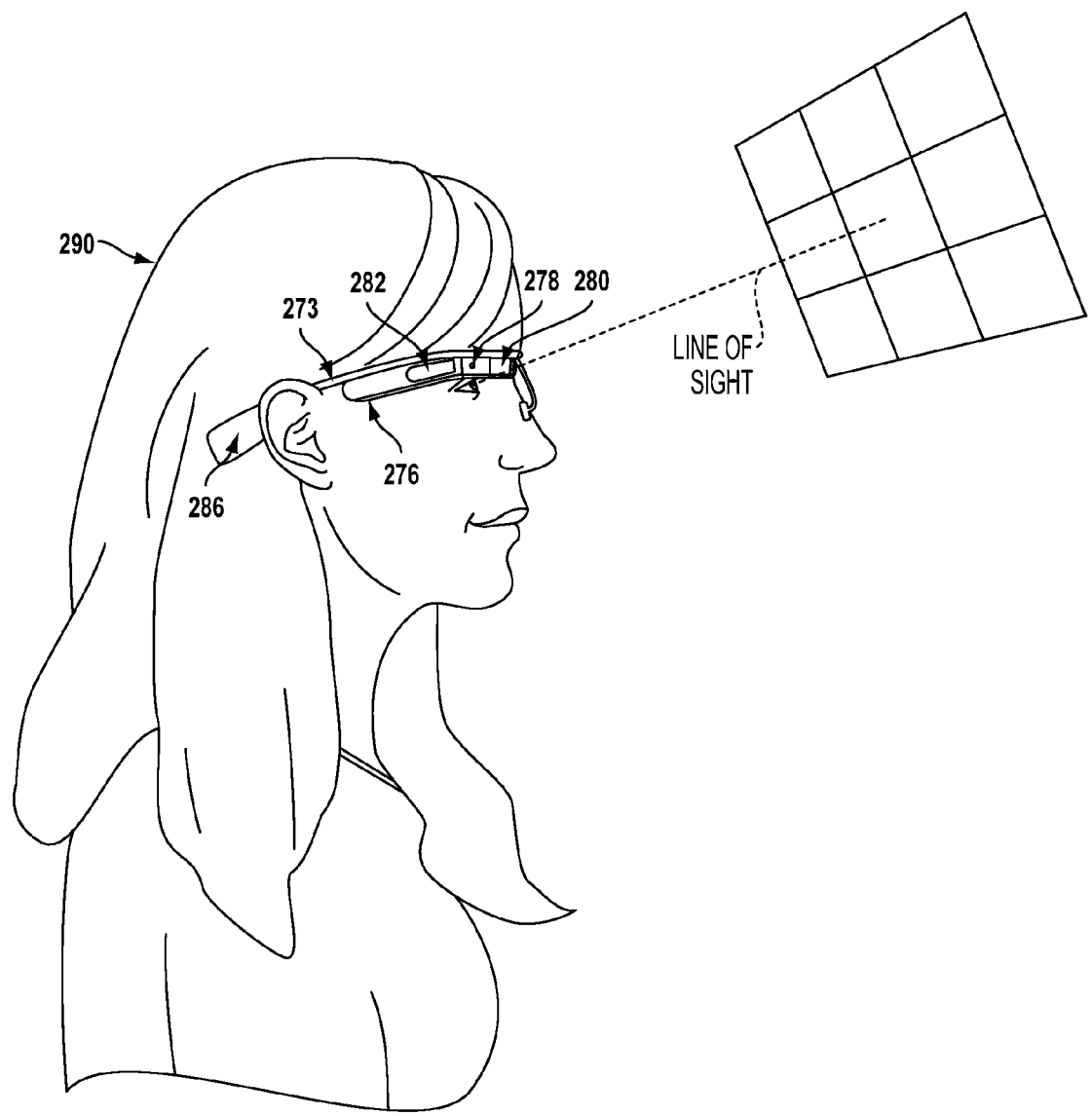

FIGS. 2E to 2G are simplified illustrations of the HMD 272 shown in FIG. 2D, being worn by a wearer 290. As shown in FIG. 2F, when HMD 272 is worn, BCT 286 is arranged such that when HMD 272 is worn, BCT 286 is located behind the wearer's ear. As such, BCT 286 is not visible from the perspective shown in FIG. 2E.

In the illustrated example, the display 280 may be arranged such that when HMD 272 is worn, display 280 is positioned in front of or proximate to a user's eye when the HMD 272 is worn by a user. For example, display 280 may be positioned below the center frame support and above the center of the wearer's eye, as shown in FIG. 2E. Further, in the illustrated configuration, display 280 may be offset from the center of the wearer's eye (e.g., so that the center of display 280 is positioned to the right and above of the center of the wearer's eye, from the wearer's perspective).

Configured as shown in FIGS. 2E to 2G, display 280 may be located in the periphery of the field of view of the wearer 290, when HMD 272 is worn. Thus, as shown by FIG. 2F, when the wearer 290 looks forward, the wearer 290 may see the display 280 with their peripheral vision. As a result, display 280 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 280 is located as shown, the wearer 290 may view the display 280 by, e.g., looking up with their eyes only (possibly without moving their head). This is illustrated as shown in FIG. 2G, where the wearer has moved their eyes to look up and align their line of sight with display 280. A wearer might also use the display by tilting their head down and aligning their eye with the display 280.

Figure 3A:
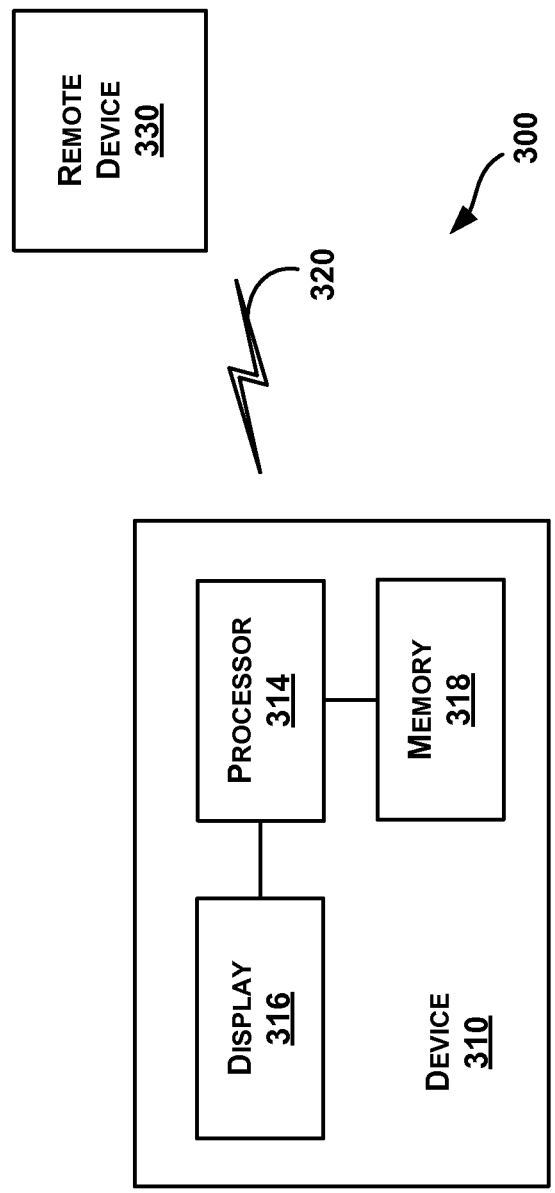
FIG. 3A is a simplified block diagram of a computing device according to an example embodiment.

FIG. 3A is a simplified block diagram a computing device 310 according to an example embodiment. In an example embodiment, device 310 communicates using a communication link 320 (e.g., a wired or wireless connection) to a remote device 330. The device 310 may be any type of device that can receive data and display information corresponding to or associated with the data. For example, the device 310 may take the form of or include a head-mountable display, such as the head-mounted devices 202, 252, or 272 that are described with reference to FIGS. 2A to 2G.

The device 310 may include a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, head-mountable display, tablet computing device, etc., that is configured to transmit data to the device 310. The remote device 330 and the device 310 may contain hardware to enable the communication link 320, such as processors, transmitters, receivers, antennas, etc.

Further, remote device 330 may take the form of or be implemented in a computing system that is in communication with and configured to perform functions on behalf of client device, such as computing device 310. Such a remote device 330 may receive data from another computing device 310 (e.g., an HMD 202, 252, or 272 or a mobile phone), perform certain processing functions on behalf of the device 310, and then send the resulting data back to device 310. This functionality may be referred to as "cloud" computing.

In FIG. 3A, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 330 may be accessible via the Internet and may include a computing cluster associated with a particular web service (e.g., social-networking, photo sharing, address book, etc.).

Figure 3B:
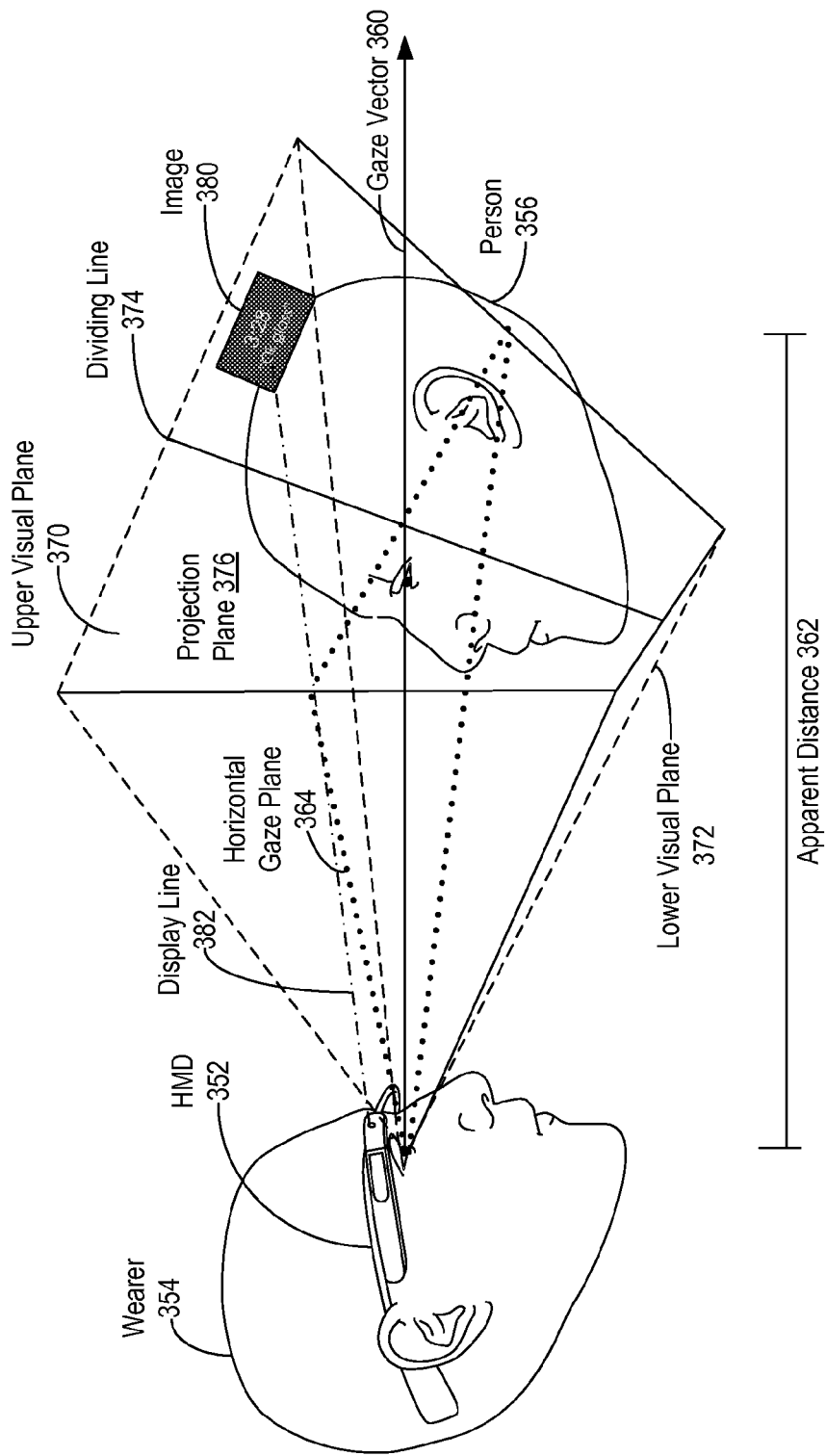
FIG. 3B shows a projection of an image by a head-mountable device, according to an example embodiment.

FIG. 3B shows an example projection of UI elements described herein via an image 380 by an example head-mountable device (HMD) 352, according to an example embodiment. Other configurations of an HMD may be also be used to present the UI described herein via image 380. FIG. 3B shows wearer 354 of HMD 352 looking at an eye of person 356. As such, wearer 354's gaze, or direction of viewing, is along gaze vector 360. A horizontal plane, such as horizontal gaze plane 364 can then be used to divide space into three portions: space above horizontal gaze plane 364, space in horizontal gaze plane 364, and space below horizontal gaze plane 364. In the context of projection plane 376, horizontal gaze plane 360 appears as a line that divides projection plane into a subplane above the line of horizontal gaze plane 360, a subplane a subspace below the line of horizontal gaze plane 360, and the line where horizontal gaze plane 360 intersects projection plane 376. In FIG. 3B, horizontal gaze plane 364 is shown using dotted lines.

Additionally, a dividing plane, indicated using dividing line 374 can be drawn to separate space into three other portions: space to the left of the dividing plane, space on the dividing plane, and space to right of the dividing plane. In the context of projection plane 376, the dividing plane intersects projection plane 376 at dividing line 374. Thus the dividing plane divides projection plane into: a subplane to the left of dividing line 374, a subplane to the right of dividing line 374, and dividing line 374. In FIG. 3B, dividing line 374 is shown as a solid line.

Humans, such wearer 354, when gazing in a gaze direction, may have limits on what objects can be seen above and below the gaze direction. FIG. 3B shows the upper visual plane 370 as the uppermost plane that wearer 354 can see while gazing along gaze vector 360, and shows lower visual plane 372 as the lowermost plane that wearer 354 can see while gazing along gaze vector 360. In FIG. 3B, upper visual plane 370 and lower visual plane 372 are shown using dashed lines.

The HMD can project an image for view by wearer 354 at some apparent distance 362 along display line 382, which is shown as a dotted and dashed line in FIG. 3B. For example, apparent distance 362 can be one meter, four feet, infinity, or some other distance. That is, HMD 352 can generate a display, such as image 380, which appears to be at the apparent distance 362 from the eye of wearer 354 and in projection plane 376. In this example, image 380 is shown between horizontal gaze plane 364 and upper visual plane 370; that is image 380 is projected above gaze vector 360. In this example, image 380 is also projected to the right of dividing line 374. As image 380 is projected above and to the right of gaze vector 360, wearer 354 can look at person 356 without image 380 obscuring their general view. In one example, the display element of the HMD 352 is translucent when not active (i.e. when image 380 is not being displayed), and so the wearer 354 can perceive objects in the real world along the vector of display line 382.

Other example locations for displaying image 380 can be used to permit wearer 354 to look along gaze vector 360 without obscuring the view of objects along the gaze vector. For example, in some embodiments, image 380 can be projected above horizontal gaze plane 364 near and/or just above upper visual plane 370 to keep image 380 from obscuring most of wearer 354's view. Then, when wearer 354 wants to view image 380, wearer 354 can move their eyes such that their gaze is directly toward image 380.

III. Illustrative Functionality

Figure 4A:
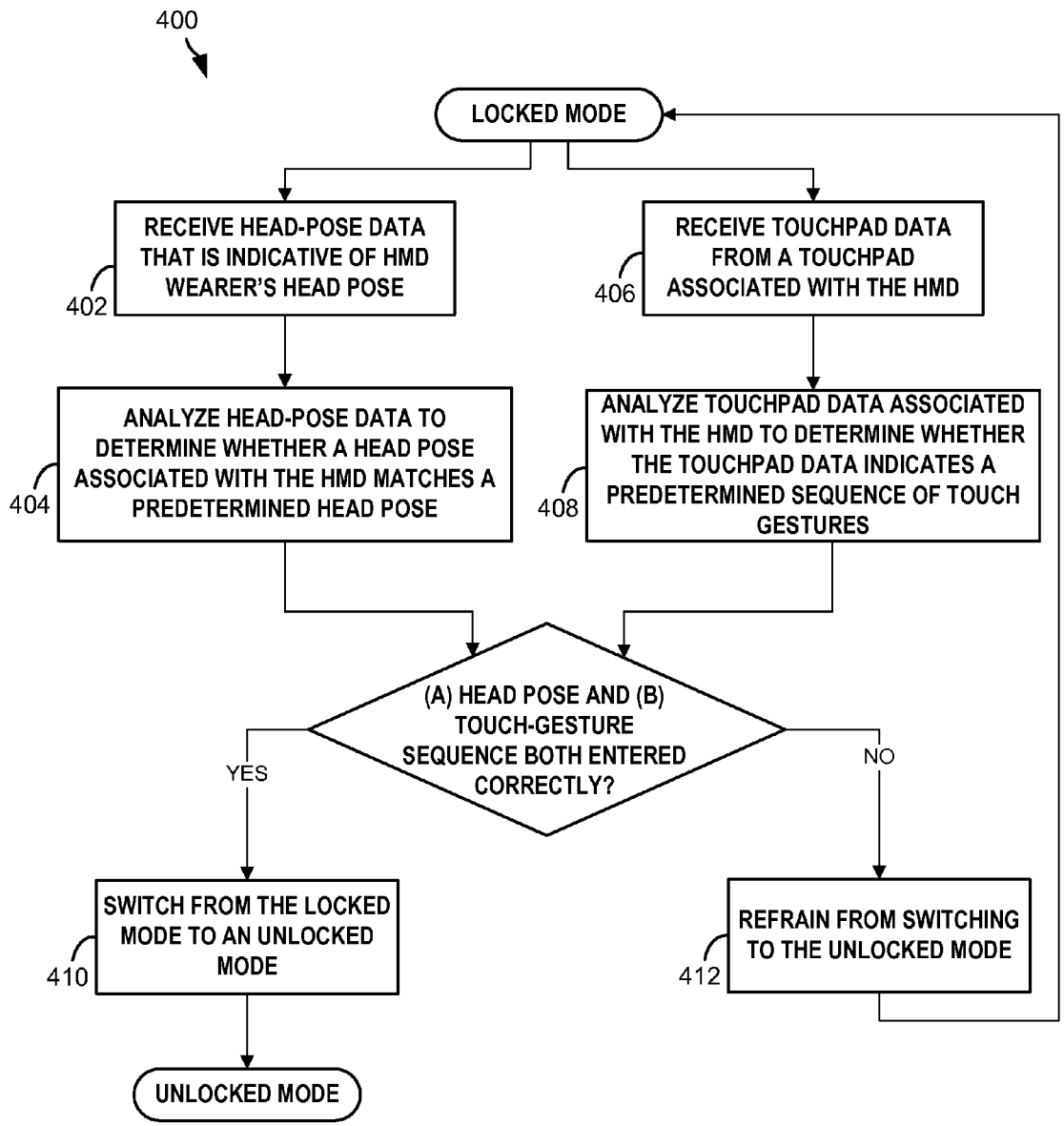
FIGS. 4A and 4B are flow charts illustrating methods, according to example embodiments.

FIG. 4A is a flow chart illustrating a method 400, according to an example embodiment. In particular, method 400 may help a user unlock an HMD via performance of an unlock sequence that includes both a predetermined head pose and a predetermined touch-gesture sequence. Note, of course, that method 400 and other example methods may be carried out by other types of computing devices, in addition or in the alternative to an HMD, without departing from the scope of the invention.

Method 400 may be implemented by an HMD that is operating in a locked mode, in which some or all of the HMD's capabilities are restricted. While in the locked mode, an HMD may receive head-pose data that, when the HMD is worn, is indicative of the wearer's head pose, as shown by block 402. As such, the HMD may analyze head-pose data to determine whether a head pose associated with the HMD matches a predetermined head pose, as shown by block 404. Further, while in the locked mode, the HMD may also receive touchpad data from a touchpad associated with the HMD, as shown by block 406. As such, the HMD may analyze touchpad data that is associated with the HMD to determine whether the touchpad data includes a predetermined sequence of touch gestures, as shown by block 408.

Then, if (a) the associated head pose matches the predetermined head pose and (b) the touchpad data indicates performance of the predetermined sequence of touch gestures, then the HMD may switch from the locked mode to an unlocked mode, as shown by block 410. Otherwise, the HMD refrains from switching to the unlocked mode, and remains locked, as shown by block 412.

In some embodiments, the HMD may require that the wearer hold the predetermined head pose while entering some or all of the touch-gesture sequence, in order to unlock the HMD. Alternatively, the HMD may not require the head pose be held during entry of the touch-gesture sequence.

Figure 4B:
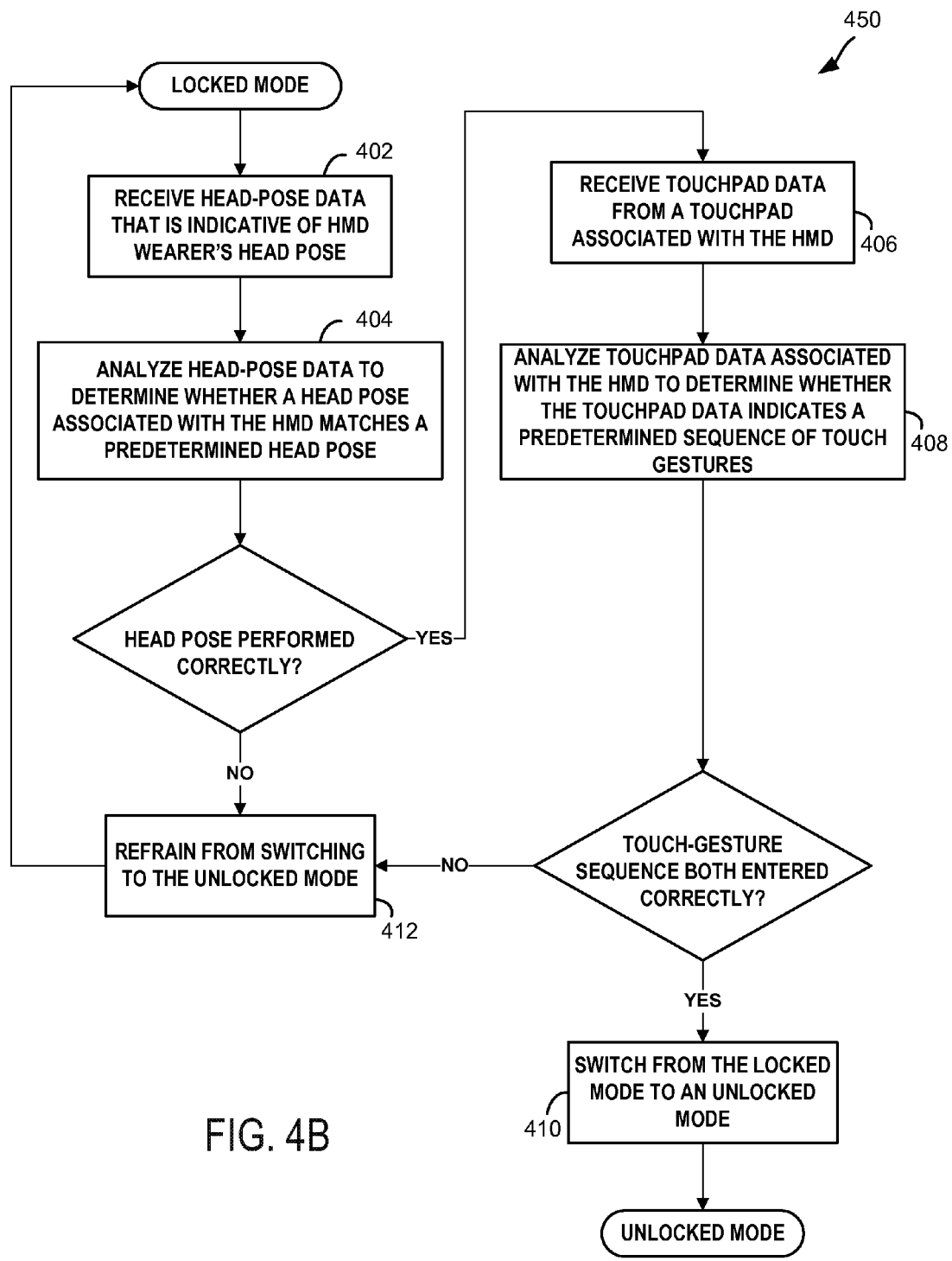

Further, note that the order with which the head pose and the touch-gesture sequence must be provided may vary, depending upon the particular implementation. In an example embodiment, the unlock sequence may first include the particular head pose, followed by the touch-gesture sequence. As such, the HMD may not begin analyzing touchpad data for the touch-gesture sequence, until the proper head pose has been detected. For example, FIG. 4B is a flow chart showing a method 450, according to an example embodiment. Method 450 is an embodiment of method 400 in which the HMD requires the predefined head pose to be performed before entry of the touch-gesture sequence, in order to unlock.

In other embodiments, the touch-gesture sequence may be entered first, followed by the particular head pose. As such, the HMD may require that the touch-gesture sequence be correctly entered, before the HMD begins analyzing head-pose data for the head pose.

And, in yet other embodiments, the HMD may not require that the head pose and touch-gesture sequence be entered in any order. In such an embodiment, the HMD may allow for the head pose to be performed before, after, or possibly even during entry of the touch-gesture sequence.

In a further aspect, at blocks 408 and 412, the function of determining whether the touchpad data includes a predetermined sequence of touch gestures may be performed on-the-fly, as each touch gesture is detected in the touch input data. For example, each time a touch gesture is detected in the touch input, the HMD may compare the newly-detected touch gesture to the next touch gesture in the touch-gesture sequence. If the newly-detected touch gesture matches the next touch gesture in the unlock sequence, then the HMD may continue the process and wait for the next touch gesture to be provided (or, if the newly-detected touch gesture matches and is the last touch gesture in the touch-gesture sequence, the HMD may determine that the unlock sequence is correct and responsively unlock). On the other hand, if a newly-detected touch gesture does not match the next touch gesture in the touch-gesture sequence, then the HMD may reset the unlock process and/or indicate to the user that there is been an error.

Alternatively, when a newly-detected touch gesture does not match the next touch gesture in the unlock sequence, the HMD may indicate this to the user and allow the user one or more additional attempts to enter the next touch gesture correctly. Further, the HMD may limit the number of additional attempts that can be made to input a given touch gesture in the unlock sequence, and/or may limit the number of total additional attempts to input touch gestures that can be made during the entire process of inputting the unlock sequence.

In other embodiments, the function of determining whether the touchpad data indicates a predetermined sequence of touch gestures may be performed on-the-fly. For example, if the unlock sequence includes a predefined head pose and a predefined sequence of four touch gestures, the HMD may wait until four touch gestures have been detected, before comparing the detected touch gestures to the predefined touch-gesture sequence to determine if there is a match.

A. Determining that Predetermined Head Pose Has Been Performed

As noted, block 404 of method 400 involves the HMD analyzing head-pose data to determine whether a detected head pose matches a predetermined head pose, as shown by block 404.

Various types of data may be used as head-pose data, from which head pose can be determined. For example, to detect movement and/or determine the pose of an HMD, the HMD may use data from its sensors, such as one or more gyroscopes, one or more accelerometers, and/or one or more magnetometers. Such data may be used to determine the pitch, roll, and/or yaw of the HMD, which numerically indicates the location (e.g., x, y, z coordinates) and/or orientation of the HMD.

In some embodiments, the position of HMD may be considered to be the position of the head. Accordingly, block 404 may involve the HMD determining whether or not the pitch, roll, and/or yaw of the HMD matches a predetermined pitch, roll, and/or yaw that define the predetermined head pose from the unlock sequence. Note that such "matching" may involve a determination that the observed values for pitch, roll, and/or yaw are equal to specific predetermined values, or may involve a determination that the observed values for pitch, roll, and/or yaw are within predetermined ranges for pitch, roll, and/or yaw.

In other embodiments, the pose of the head may be calculated based on the position of the HMD. In particular, when an HMD is worn, the HMD is offset from the axes around which the wearer's head moves. However, the position of the HMD relative to the axes of head movement may be estimated, or actively determined for the particular wearer. Thus, the HMD can determine the movement and/or position of the wearer's head that corresponds to a known movement and/or position of the HMD. In such an embodiment, block 404 may involve the HMD determining whether or not the pitch, roll, and/or yaw of the wearer's head matches a predetermined pitch, roll, and/or yaw that define the predetermined head pose in the unlock sequence.

Further, in an example embodiment, an error tolerance or tolerances may be defined for pitch, roll, and yaw, such that the user does not need to replicate the exact head pose, when performing the head pose for the unlock sequence. The error tolerance or tolerances may effectively define ranges of pitch, roll, and/or yaw (e.g., within +/−5 degrees from 45 degrees yaw, and so on), which are considered to match the predetermined head pose in the unlock sequence. Further, the error tolerance or tolerances for pitch, roll, and/or yaw could be determined from user settings, could be dynamically determined by the HMD based on observations of the user's skill in performing the head pose, or could be determined in another manner.

As noted above, a head pose may be numerically indicated by the pitch, roll, and/or yaw of the head (or of the HMD). In an embodiment where the head pose is defined by pitch, roll, and yaw, the head-pose data may be a real-time stream of three-dimensional coordinates; e.g., a stream of (x, y, z) values, in which each set of (x, y, z) coordinates indicates the pose of the head at a particular time. Accordingly, the computing device may determine that the head pose in the unlock sequence is correctly performed when the (x, y, z) coordinates remain within acceptable ranges (e.g., within respective error tolerances) for a predetermined period of time, or possibly for at least a threshold percentage of a predetermined period of time. Further, note that in some embodiments, head pose may be defined by the combination of the location of the head (e.g., x, y, z coordinates) and the orientation of the head.

Note that while the above examples describe the head pose for the unlock sequence as being defined three-dimensionally (e.g., by pitch, roll, and, yaw), the head pose may also be defined two-dimensionally or one-dimensionally, without departing from the scope of the invention.

B. Determining Whether Touch Input Matches a Pre-Defined Touch-Gesture Sequence

As noted above, block 408 of method 400 may involve an HMD analyzing touchpad data to determine whether the touchpad data indicates a predetermined sequence of touch gestures that is part of the unlock sequence. The unlock sequence may include various types of gestures, which may be provided via various types of touch-sensitive interfaces.

In an example embodiment, the touch-gesture sequence may include various types of gestures, such as taps and/or swipes on a touchpad or touchscreen. For instance, at block 408, an HMD such as HMD 272 of FIG. 2D, may detect taps and/or swipes on a side-mounted touchpad 282. Accordingly, a user that is wearing HMD 272 may input an unlock sequence by performing the predetermined head pose, and entering the predetermined sequence of touch gestures that make up their unlock sequence by tapping and/or swiping the side-mounted touchpad 282 of HMD 272.

Various types of touch gestures may be included in the touch-gesture sequence. For example, a tap on the touchpad may be considered to be a distinct type of touch gesture that is usable in the touch-gesture sequence. Further, a tap and a double-tap may be considered to be two distinct touch gestures, which may be included in the touch-gesture sequence. Note that a double-tap may be performed by tapping the touchpad twice in rapid succession. As such, a computing device may detect a double-tap when two consecutive taps are detected within a predetermined period of time.

In a further aspect, a swipe in a particular direction may be used as part of the touch-gesture sequence. For instance, in an example embodiment, a touchpad may allow for one-dimensional touch input. The one-dimensional touch input may be represented by data that indicates a touch location along a single axis linear movement, such that movement forward or backward can be indicated from the data (or alternatively, such that movement up or down can be indicated). In such an embodiment, the touch-gesture sequence may include forward swipes and/or backward swipes (or alternatively, upward swipes and/or downward swipes).

In other embodiments, a touchpad may allow for two-dimensional touch input. The two-dimensional touch input may be represented by data that indicates coordinates for touch locations along two axes (e.g., an x- and y-axis), such that movement forward, backward, upward, downward, and diagonally can be indicated by the data. In such an embodiment, the touch-gesture sequence may include forward swipes, backward swipes, upward swipes, downward swipes, and/or diagonal swipes.

In a further aspect, a computing device may detect two-finger gestures, such as two-finger swipe gestures and/or two-finger tap gestures. Such two-finger gestures may each be considered a distinct touch gesture for purposes of the touch-gesture sequence. For example, a two-finger tap may be detected when data from the touchpad indicates touch at two locations on the touchpad at substantially the same time. Similarly, a two-finger double-tap may be detected when data from the touchpad indicates a first instance of touch at two locations at substantially the same time, followed by a second instance of touch at two locations at substantially the same time, within a predetermined period of time.

Figure 5:
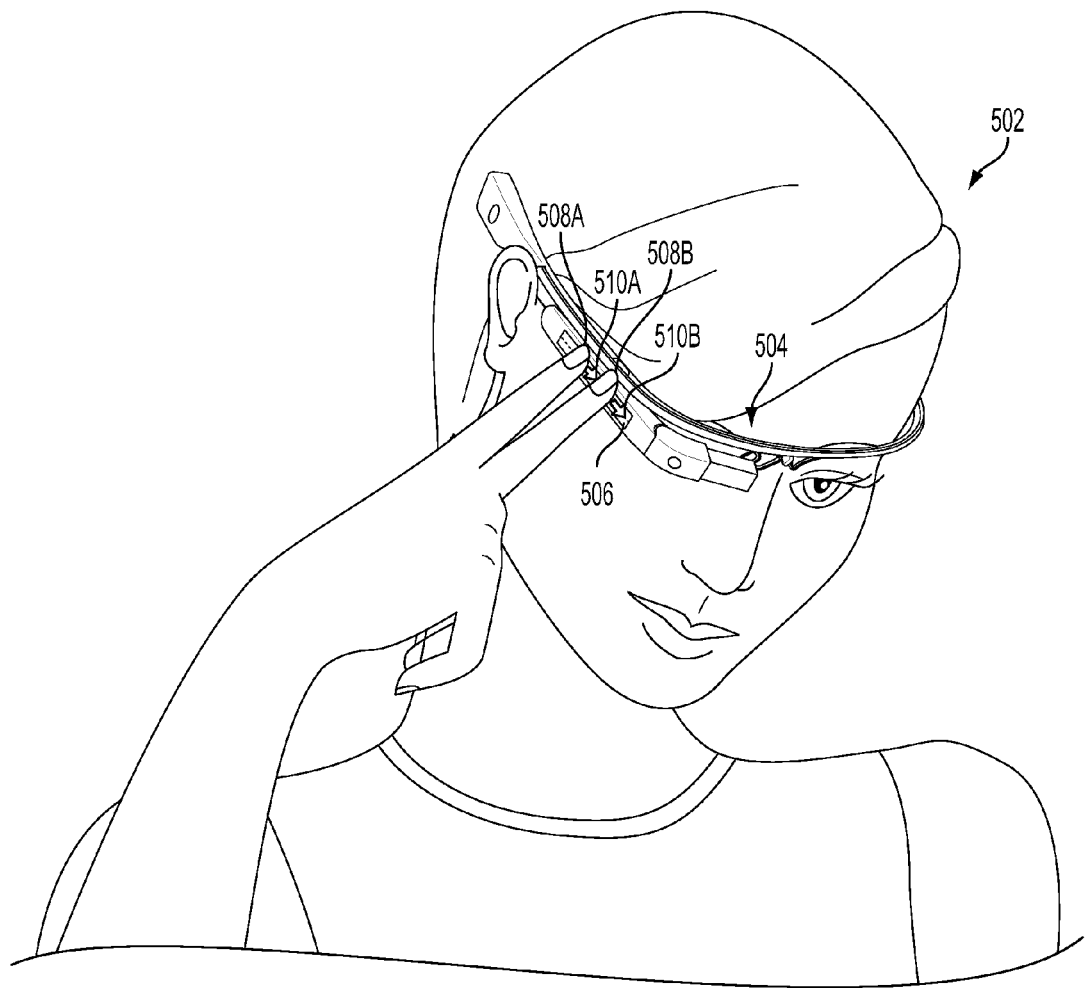
FIG. 5 shows a two-finger swipe, according to an example embodiment.

Yet further, various types of two-finger swipes on a touchpad may be indicated by touch input. For example, when an HMD has a one-dimensional touchpad, the HMD may detect a two-finger swipe when data from the touchpad indicates simultaneous swipes in the same direction, which start from different locations on the touchpad. For example, FIG. 5 shows a two-finger swipe, according to an example embodiment. As shown, a user 502 has placed a first finger 508A and a second finger 508B on the side-mounted touchpad 506 of HMD 504, with the first finger 508A behind the second finger 508B. The user simultaneously slides their first finger 508A and their second finger 508B in the same direction along touchpad 506, as indicated by arrow 510A and arrow 510B, respectively.

Note that the two-finger swipe illustrated in FIG. 5 may be considered a two-finger forward swipe. A user 502 could also perform a two-finger swipe by simultaneously sliding their first finger 508A and second finger 508B in the opposite direction. Further, in some embodiments, the directionality with which swipes are interpreted may be changed via a user-setting; e.g., such that a swipe in the direction of arrows 510A and 510B is interpreted by HMD 504 as a backward swipe instead of a forward swipe. Further, note that such a setting may be used to reverse the interpretation of single- and/or multi-finger swipes.

Note that the above examples of possible touch gestures are not intended to be limiting. The unlock sequence may additionally or alternatively include other types of touch gestures, which may involve more than two fingers, and/or more than one dimension (e.g., upward, downward, and/or diagonal swipes). Further, in some embodiments, touch gestures such as taps and/or swipes could be performed anywhere on the touchpad. Alternatively, taps and/or swipes could be location-specific, which may increase the number of possible touch gestures from which the touch-gesture sequence may be formed. For example, an HMD could distinguish between taps in the front, middle, and back portion of a touchpad, such that three different types of single-finger taps and/or three different types of double-finger taps may be used in the touch-gesture sequence. Other examples are also possible.

Note that a "single-point" or "one-point" gesture may be any touch gesture that involves a single point of contact with a touchpad interface, such as a one-finger tap, one-finger swipe, or a tap or swipe with a device such as a stylus. Further, a "multi-point" gesture may be any touch gesture that involves a multiple simultaneous points of contact with a touchpad interface. For example, a two-point gesture may include a two-finger tap or swipe, or a two-point tap or swipe performed with two styluses or a stylus and a finger. Other examples of multi-point gestures are also possible.

Further, note that for explanatory purposes, examples may be described with reference to touchpad gestures being performed via a single finger or multiple fingers. It should be understood that examples that reference a touch gesture involving a finger or fingers may apply equally to touch gestures that involve another type of input device, such as a stylus. For example, embodiments that recite a one-finger or two-finger gesture should be understood to encompass a one-point or two-point gesture that is performed with a stylus. Other examples are also possible.

C. Defining an Unlock sequence

In an example embodiment, an HMD or another computing device may provide a setup application that can be used to define the head pose and/or touch-gesture sequence that make up a user's unlock sequence. As such, the head pose and/or touch-gesture sequence that allows a user to unlock their HMD may be defined via user input that the HMD receives via the setup application.

Various features may be provided to define the head pose for the unlock sequence. For example, an HMD's setup application may prompt the user to position their head in the desired pose, and then record the head pose (e.g., the pitch, roll, and/or yaw). In some embodiments, the process of prompting the user to perform the desired head pose and recording the observed pose may be repeated a number of times. The repetition may help the HMD to more accurately determine the head pose and/or help the HMD determine an appropriate error tolerance (e.g., ranges of acceptable pitch, roll, and/or yaw) that are considered to be match the predetermined head pose. The repetition of the head pose may also help the user to remember the head pose.

Various techniques may also be used to define the touch-gesture sequence that is part of the unlock sequence. For instance, an HMD's setup application may prompt the user to enter a desired sequence of touch gestures. Further, the setup application may prompt the user to repeat this process one or more times in order to confirm the sequence of touch gestures.

Note that the number of touch gestures in the touch-gesture sequence may be fixed. For example, a user may always be required to enter a sequence of four touch gestures. Alternatively, the number of touch gestures in the touch-gesture sequence may not be fixed, and may be established via a user setting, or simply by inputting a touch-gesture sequence of the desired length. For example, a user setting may be adjusted so that the user can define a three, four, or five touch gesture sequence for the unlock sequence. Other examples are also possible.

In a further aspect, the touch gestures that make up the touch-gesture sequence may be selected from a set of pre-defined touch gestures. Accordingly, a setup application may indicate the possible touch gestures that are useable in a touch-gesture sequence; e.g., by displaying text that describes each type of touch gesture, and/or by displaying images, graphic animations, or video showing how the different types of touch gestures can be performed.

Various touch-gesture sets are possible, depending upon the particular implementation. In some embodiments, a set of one-finger touch gestures may be used as part of the unlock sequence. For instance, the set of touch-gestures that may be used for the touch-gesture sequence includes: (a) a single-finger tap, (b) a forward swipe (e.g., moving a single finger forward along the touchpad), (c) a backward swipe, (d) a forward-and-backward swipe (e.g., moving the finger forward and then backward in a single motion, without lifting the finger from the touchpad), and (e) a backward-and-forward swipe (e.g., moving the finger backward and then forward in a single motion, without lifting the finger from the touchpad).

In some embodiments, the set of touch-gestures that can be used in the unlock sequence may include one-finger and two-finger touch gestures. In one example, the set of possible touch gestures includes: (a) a single-finger tap, (b) a two-finger tap, (c) a forward swipe, (d) a two-finger forward swipe (e.g., simultaneously moving two fingers forward along the touchpad, (e) a backward swipe, (f) a two-finger backward swipe, (g) a forward-and-backward swipe, (h) a two-finger forward-and-backward swipe (e.g., simultaneously moving two fingers forward and then backward in a single motion, without lifting the two fingers from the touchpad), (i) a backward-and-forward swipe, and (j) a two-finger backward-and-forward swipe (e.g., simultaneously moving two fingers backward and then forward in a single motion, without lifting the two fingers from the touchpad).

Note that the above-described set provides ten possible touch gestures. Accordingly, this set provides the same number of combinations for a touch-gesture sequence of a given length is the same, as a numeric code of the same length. For example, in the same way that 10,000 4-digit codes can be formed with the set of numbers 0 to 9, the ten-gesture set above provides 10,000 possible sequences for a sequence of four touch-gestures.

Note that the above examples of touch-gesture sets, from which a touch-gesture sequence may be formed, are provided for purposes of illustration, and are not intended to be limiting. Many other touch-gesture sets are also possible.

D. Audio and/or Visual Feedback for Unlocking a Device

In a further aspect, an HMD may provide audio and/or visual feedback as an unlock sequence is entered, which may assist in performance of the predefined head pose and/or entry of a touch-gesture sequence. Further, audio and/or visual feedback may be provided to indicate whether or not the user has correctly performed the predefined head pose and/or the predefined sequence of touch gestures.

In some embodiments, the HMD may display graphical feedback that indicates a wearer's head pose, and thus facilitates the performance of the head pose for their unlock sequence. For example, an HMD's may display a head or some graphical representation of a head. The HMD may then move the graphic of the head based on the same head-movement data in which the head pose is detected, so that the movement of graphical head follows the wearer's head movements.

As another example, head pose could be represented in a three-dimensional coordinate system. For instance, when the head-pose data is a real-time stream of three-dimensional (x, y, z) coordinates, an HMD may animate the head pose in the display. For example, FIG. 6 shows a lockscreen 600 with visual feedback to facilitate performance of a predefined head pose, according to an example embodiment. As shown, the HMD's inward-facing display may display x, y, and z axes, and a graphic 602 that represents the wearer's head pose.

Graphic 602 includes a pivot point 601 that is located at the intersection of the x, y, and z axis, which may visually represent the point in the neck about which the wearer's head pivots. Further, the point 603 at the opposite end of graphic 602 may be moved rotation of the head around the pivot point in the neck. Accordingly, when a user looks down and to the left, as in FIG. 1A, the HMD may rotate graphic 602 as shown by the dotted lines in FIG. 6. Thus, from the wearer's perspective, graphic 602 will appear to rotate about the pivot point 601 in the same manner as their head rotates.

In a further aspect, a display such as lockscreen 602 could include a graphic that indicates the x, y, and z coordinates of the point 603. Such visual feedback may help the wearer remember and perform their predefined head pose, rather than relying on muscle memory. Specifically, the wearer could simply remember their x, y, and z coordinates, and move their head until the point 603 arrives at the coordinates for their head pose. Note that when such visual feedback is provided on an inward-facing display of an HMD, displaying the coordinates to the wearer should not increase the risk of a bystander learning the predefined head pose through observation of it being performed.

Figure 7:
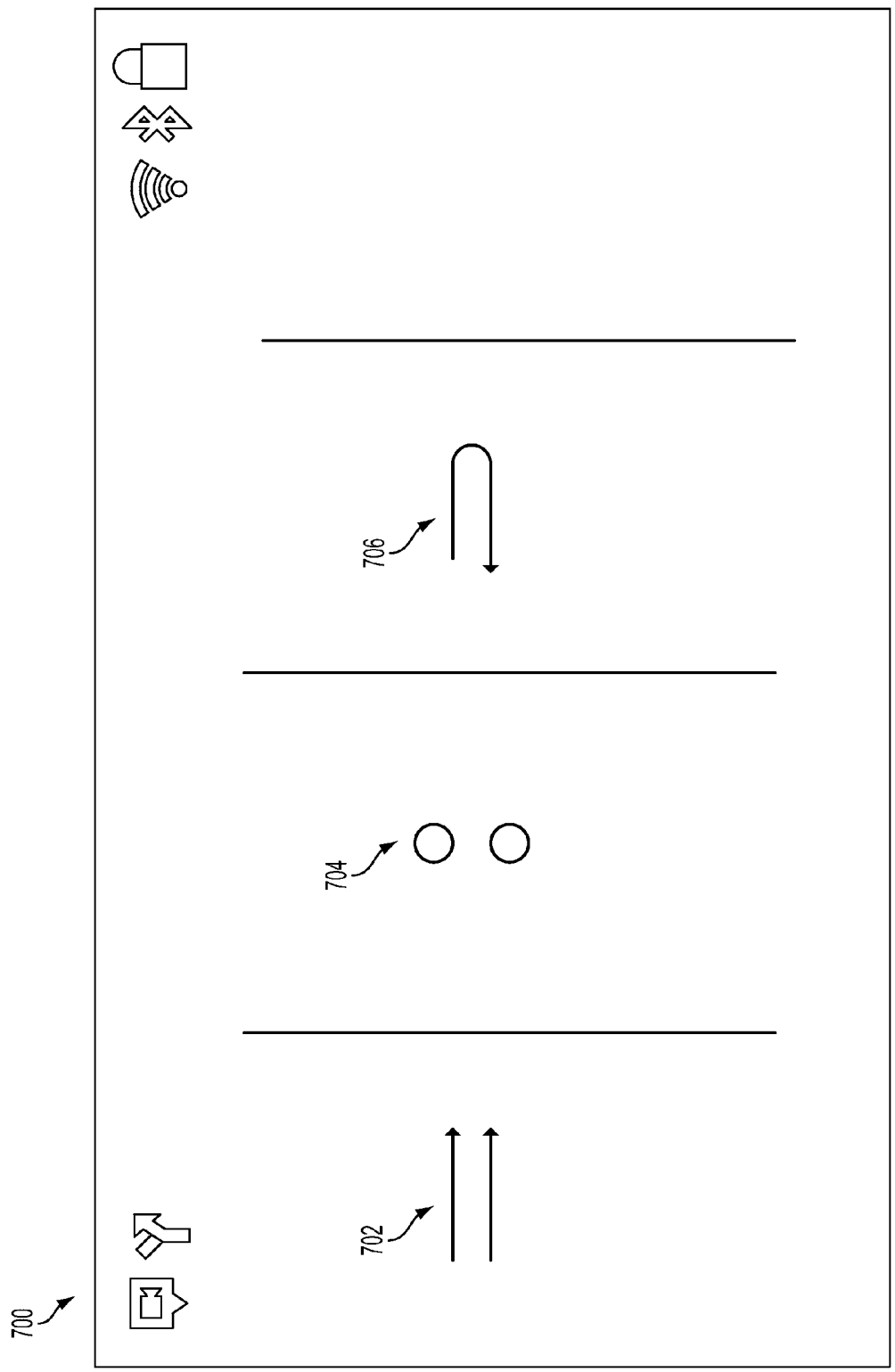
FIG. 7 shows a screen with visual feedback for performance of touch gestures, according to an example embodiment.

FIG. 7 shows a screen 700 with visual feedback for performance of touch gestures, according to an example embodiment. Symbols and/or graphics may be displayed on a lockscreen interface, such as screen 700, to indicate to the user which touch gestures have been detected by the HMD. In the illustrated example, the HMD may have detected entry of a two-finger forward swipe, followed by a two-finger tap, followed by a forward-and-back swipe. As such, the lock screen 700 may display double arrow graphic 702 when the two-finger forward swipe is detected (note that the double arrow graphic may be animated and appear gradually as the swipe is performed, or appear at once, when the swipe is complete). The lock screen may then display two-dot graphic 704 when the two-finger tap is detected, followed by the forward-and-back arrow 706 when the forward-and-back swipe is detected.

Note that in the illustrated example, lockscreen 700 is being provided for entry of a unlock sequence that includes four touch gestures. Accordingly, the fourth column on the far right of lockscreen 700 is blank, and may be updated to display a symbol corresponding to a next touch gesture, when the next gesture is detected by the HMD.

Figure 8:
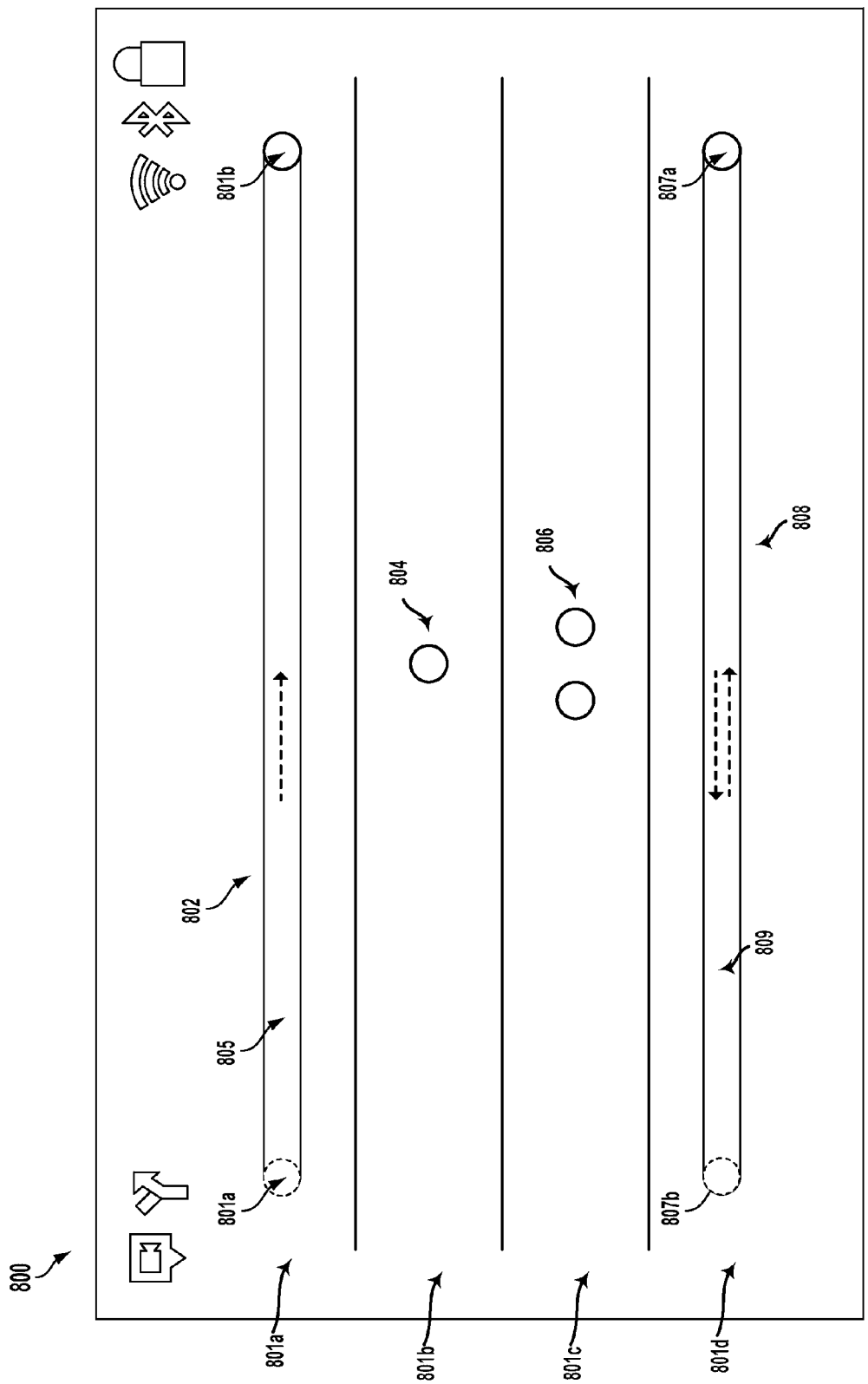
FIG. 8 shows another screen with visual feedback for performance of touch gestures, according to an example embodiment.

FIG. 8 shows another screen 800 with visual feedback for performance of touch gestures, according to an example embodiment. In particular, a lockscreen such as screen 800 may provide dot-based feedback to indicate entry of touch-gesture sequence. In the illustrated example, the user may have entered a touch-gesture sequence that includes a forward swipe, followed by a single-finger tap, followed by a two-finger tap, followed by a backward-and-forward swipe. Accordingly, lockscreen 800 may first display the graphic 802 that corresponds to the forward swipe, followed by the graphic 804 that corresponds to a single-finger tap, followed by the graphic 806 that corresponds to a two-finger tap, followed by the graphic 808 that corresponds to a backward-and-forward swipe.

In an example embodiment, the graphic 802 that corresponds to the forward swipe may be animated at substantially the same time as the forward swipe is being performed. More specifically, when the HMD detects a touch in a back portion of the touchpad, the HMD may display a dot at the left side of row 801a, which is represented by the dotted circle at location 803a in row 801a. When the HMD detects touchpad data corresponding to the wearer sliding their finger forward on the touchpad, the HMD may animate motion of the circle from the location 803a along path 805 in row 801a. When the wearer has slid a certain distance forward along the touchpad, the HMD may show the circle at the end location 803b of path 805.

Further, the HMD may consider a touch gesture to be complete when it detects the user has lifted their finger off of the touchpad. Accordingly, once the user moves the circle in row 801a to location 803a, and then lifts their finger, the HMD may consider the forward swipe to have been completed, and visualize subsequent touch input in the second row 801b. In the illustrated example, when the HMD subsequently detects the one-finger tap, the HMD may display a circle 804 in the middle of row 801b. Then, when the HMD detects the two-finger tap, the HMD may display two circles 806 in the middle of row 801c.

Further, the graphic 808 that corresponds to the backward-and-forward swipe may be animated at substantially the same time as the backward-and-forward swipe is being performed. More specifically, when the HMD detects a one-finger touch in a front portion of the touchpad, the HMD may display a single circle at the right side of row 801d, e.g., at location 807a in row 801d. When the HMD detects touchpad data corresponding to the wearer sliding their finger backward or forward on the touchpad, the HMD may animate motion of the circle backward or forward along path 809. When the wearer slides a certain distance backward and then slides a certain distance forward, without lifting their finger from the touchpad, the HMD may move the circle from location 807a to location 807b, and then back to location 807a. When the circle is moved back to location 807a, and the HMD detects that the user has lifted their finger from the touchpad, the HMD may determine that the last touch gesture is a backward-and-forward swipe.

Note that the arrows shown in paths 805 and 809 are provided to show the direction of the respective swipe gestures 802 and 808, and the movement of the circle on the screen 800 when each gesture 802 and 808 is detected. These arrows may or may not be displayed in screen 800, depending upon the particular implementation.

In a further aspect, as each touch gesture is detected, an HMD may play out a sound to indicate whether the touch gesture is correct (e.g., whether the touch gesture matches the next touch gesture in the unlock sequence). For example, the HMD could play out different sounds for correct and incorrect touch gestures. Additionally or alternatively, different sounds could be used to indicate different types of touch gestures. For example, certain sounds could be played out for taps and certain sounds could be played out for swipes. Further, different sounds could indicate different types of taps (e.g., a single-finger tap or a two-finger tap). Similarly, different sounds could indicate different types of swipes (e.g., a forward swipe, a backward swipe, a two-finger forward swipe, a two-finger backward swipe, a forward-and-backward swipe, a backward-and-forward swipe, a two-finger forward-and-backward swipe, and/or a two-finger backward-and-forward swipe).

In an example embodiment, the above audio feedback may be played out at the same time as visual feedback is being provided via lockscreen 700 or lockscreen 800. However, note that such audio feedback could be played out without any accompanying visual feedback and/or played out in association with other types of visual feedback.

Other types of visual (and possibly audible) feedback may be provided to facilitate performance of a predefined head pose. Further, in some embodiments, there may be no feedback to assist in performance of the predefined head pose.

IV. Additional Aspects

In some embodiments, when an attempt to input an unlock sequence is determined to have failed (e.g., when a user is not able to perform the head pose in a predetermined period of time or does not enter a matching sequence of touch gestures), the computing device, such as an HMD, may reset the lockscreen and allow one or more additional attempts to input the unlock sequence. Further, a computing device may implement a process that provides additional security in the event of multiple unsuccessful attempts to input the unlock sequence. For example, after a certain number of unsuccessful attempts, the computing device may responsively disable the lockscreen for a certain period of time (referred to herein as a "lockout period"), such that the user cannot unlock the device.

Further, if additional unsuccessful attempts are made after the lockout period ends, the computing device may increase the duration of a subsequent lockout period. As a specific example, a computing device could lock a user out for one minute after five unsuccessful attempts, for an hour after five more unsuccessful attempts (e.g., ten unsuccessful attempts in total), for a day after five more unsuccessful attempts (e.g., fifteen unsuccessful attempts in total), and so on. Other examples are also possible.

In another aspect, while an HMD is locked, the HMD may be configured to determine whether or not the HMD is being worn. For example, the HMD may utilize capacitive sensors and/or detect certain motion that are characteristic or the HMD being worn (or not being worn), to determine whether or not the HMD is being worn. Additionally or alternatively, the HMD might include proximity sensors arranged to provide data that is indicative of whether or not the HMD is being worn. Configured as such, the HMD may refrain from carrying out an example method such as method 400, or portions thereof, until a determination is made that the wearable computing device is being worn. Doing so may help to conserve battery life, among other possible benefits.

In a further aspect, an HMD may further require the predetermined touch-gesture sequence be performed with a particular rhythm, in order to unlock. Accordingly, an example method may further involve the HMD determining whether the rhythm with which touch gestures are detected matches a predetermined rhythm pattern. In such an embodiment, the HMD may only unlock when the predetermined head pose is performed and the predetermined touch-gesture sequence is performed with the predetermined rhythm pattern.

V. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computing device comprising:
a non-transitory computer readable medium; and
program instructions stored on the non-transitory computer readable medium and executable by at least one processor to:
cause a computing device to operate in a locked mode; and
while the computing device is in the locked mode:
(a) analyze head-pose data to determine a head pose associated with the computing device;
(b) analyze touchpad data associated with the computing device to detect a sequence of touch gestures; and
(c) determine both (i) that the determined head pose matches a predetermined head pose and (ii) that the detected sequence of touch gestures matches a predetermined sequence of touch gestures, and responsively cause the computing device to switch to an unlocked mode.

2. The device of claim 1, wherein the program instructions stored on the non-transitory computer readable medium and executable by at least one processor to determine that the head pose associated with the computing device matches the predetermined head pose comprise program instructions stored on the non-transitory computer readable medium and executable by at least one processor to:
determine whether or not the head pose associated with the computing device is within a predetermined range of head poses.

3. The device of claim 1, wherein the predetermined head pose is defined by a pitch, a roll, and a yaw.

4. The device of claim 1, wherein the predetermined head pose is defined by a pitch range, a roll range, and a yaw range.

5. The computing device of claim 1, wherein the predetermined sequence of touch gestures comprises at least: one or more tap gestures and one or more swipe gestures.

6. The computing device of claim 1, wherein the predetermined sequence of touch gestures comprises at least two or more of the following: one or more tap gestures, one or more forward swipe gestures, one or more backward swipe gestures, one or more forward-and-backward swipe gestures, and one or more backward-and-forward swipe gestures.

7. The computing device of claim 1, wherein the predetermined sequence of touch
gestures comprises at least two or more of the following: one or more single-point tap gestures, one or more single-point forward swipe gestures, one or more single-point backward swipe gestures, one or more single-point forward-and-backward swipe gestures, one or more single-point backward-and-forward swipe gestures, one or more multi-point tap gestures, one or more multi-point forward swipe gestures, one or more multi-point backward swipe gestures, one or more multi-point forward-and-backward swipe gestures, and one or more multi-point backward-and-forward swipe gestures.

8. The computing device of claim 1, wherein the predetermined sequence of touch gestures comprises one or more horizontal swipe gestures.

9. The computing device of claim 1, wherein the predetermined sequence of touch gestures comprises one or more vertical swipe gestures.

10. The computing device of claim 1, further comprising program instructions stored on the non-transitory computer readable medium and executable by at least one processor to:
as the touchpad data is analyzed, cause a display of the computing device to display visual feedback corresponding to at least one of head pose indicated by the head-pose data and touch gestures detected in the touchpad data.

11. The computing device of claim 1, further comprising program instructions stored on the non-transitory computer readable medium and executable by at least one processor to:

as the touchpad data is analyzed, cause an audio system of the computing device to play out audible feedback that indicates whether or not touch gestures detected in the touchpad data match the predetermined sequence of touch gestures.

12. The computing device of claim 1, wherein the computing device is a head-mountable computing device, the computing device further comprising program instructions stored on the non-transitory computer readable medium and executable by at least one processor to:
   while the computing device is in the locked mode:
      analyze data associated with the computing device to determine whether or not the computing device is being worn; and
      refrain from carrying out (a) to (c) until a determination is made that the computing device is being worn.

13. The computing device of claim 1, wherein the switch to the unlocked mode is conditioned upon the associated head pose continuing to match the predetermined head pose while the predetermined sequence of touch gestures are being detected.

14. The computing device of claim 1, wherein the program instructions stored on the non-transitory computer readable medium and executable by at least one processor to detect the sequence of touch gestures further comprise program instructions stored on the non-transitory computer readable medium and executable by at least one processor to:
   determine whether a rhythm with which touch gestures are detected matches a predetermined rhythm pattern.

\* \* \* \* \*